United States Patent
Yuki

(10) Patent No.: US 9,470,878 B2
(45) Date of Patent: Oct. 18, 2016

(54) ZOOM LENS AND IMAGE PICKUP APPARATUS USING THE SAME

(71) Applicant: CANON KABUSHIKI KAISHA, Tokyo (JP)

(72) Inventor: Akihiko Yuki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/557,830

(22) Filed: Dec. 2, 2014

(65) Prior Publication Data
US 2015/0177499 A1 Jun. 25, 2015

(30) Foreign Application Priority Data
Dec. 25, 2013 (JP) ................... 2013-266577

(51) Int. Cl.
G02B 15/16 (2006.01)
G02B 13/00 (2006.01)
G02B 15/173 (2006.01)
G02B 27/64 (2006.01)

(52) U.S. Cl.
CPC .............. *G02B 13/009* (2013.01); *G02B 15/16* (2013.01); *G02B 15/173* (2013.01); *G02B 27/646* (2013.01)

(58) Field of Classification Search
CPC ...... G02B 15/14; G02B 15/15; G02B 15/16; G02B 15/20; G02B 15/22; G02B 13/009
USPC .......................... 359/676, 686, 687
See application file for complete search history.

(56) References Cited

U.S. PATENT DOCUMENTS

2013/0300868 A1* 11/2013 Yamamoto ........... G02B 15/173
                                                                348/143
2014/0049673 A1* 2/2014 Nakamura ............. G02B 15/14
                                                                348/294

FOREIGN PATENT DOCUMENTS

| JP | 2009-098449 A | 5/2009 |
| JP | 2012-048033 A | 3/2012 |

* cited by examiner

*Primary Examiner* — Darryl J Collins
(74) *Attorney, Agent, or Firm* — Carter, DeLuca, Farrell & Schmidt, LLP

(57) ABSTRACT

A zoom lens includes, in order from the object side to the image side, a positive first lens unit, a negative second lens unit, a positive third lens unit, and a positive fourth lens unit. The lens units move during zooming from the wide angle end to the telephoto end. The first lens unit consists of three or less lenses. The second lens unit consists of four or less lenses. The third lens unit consists of four or less lenses. The fourth lens unit consists of two or less lenses. The lateral magnification β3w of the third lens unit at the wide angle end, the lateral magnification β3t of the third lens unit at the telephoto end, the focal length f3 of the third lens unit, and the focal length ft of the entire system at the telephoto end are determined appropriately.

21 Claims, 13 Drawing Sheets

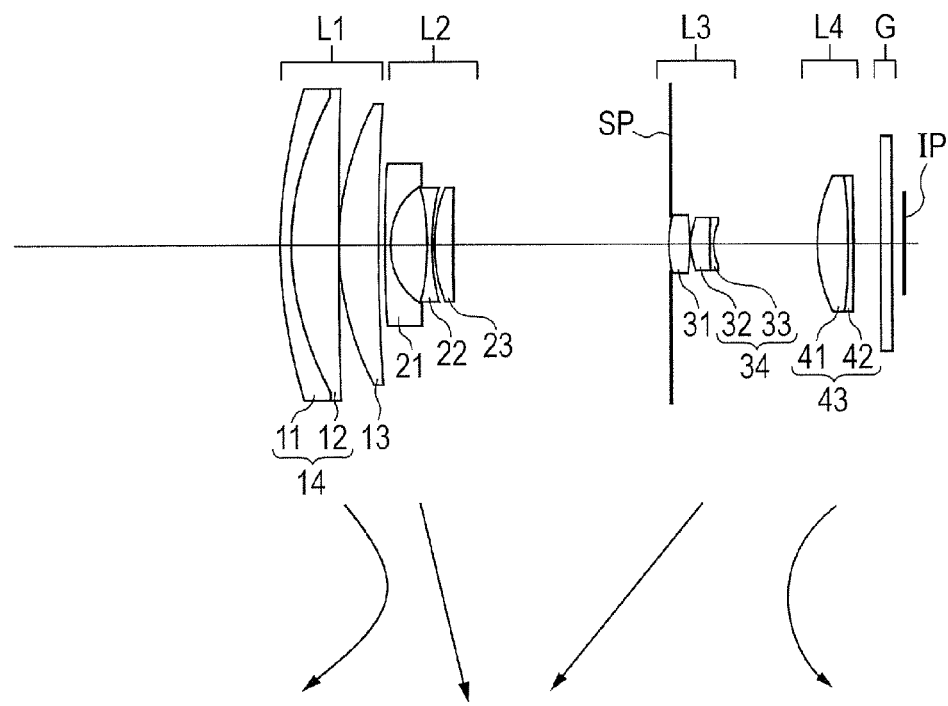
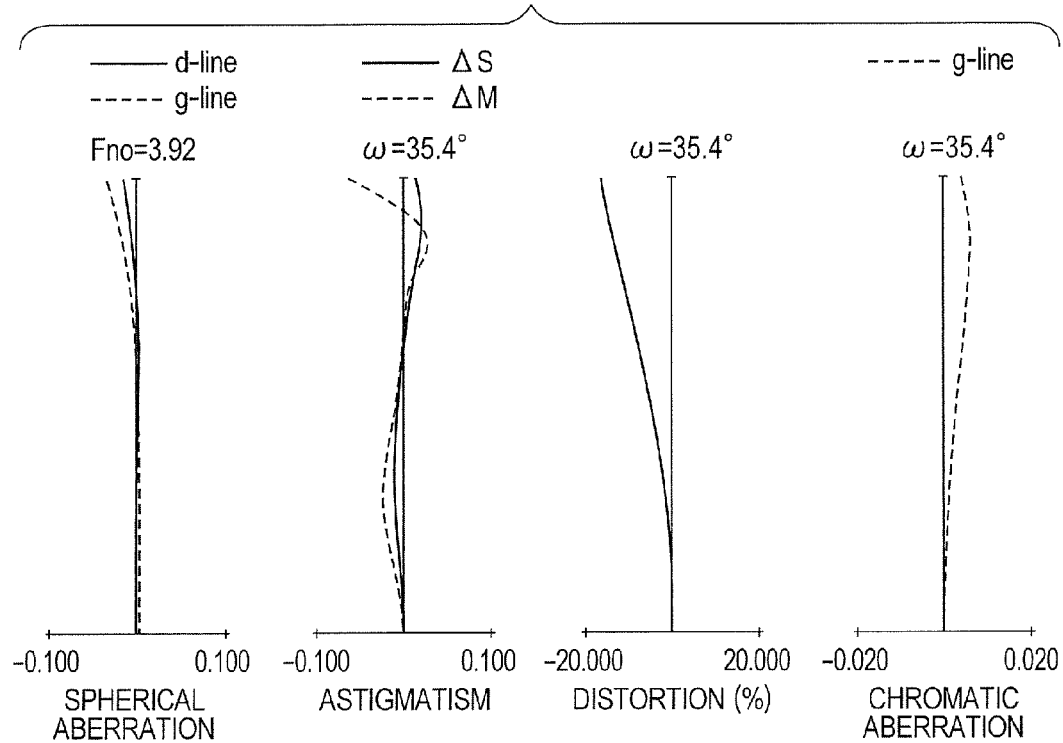

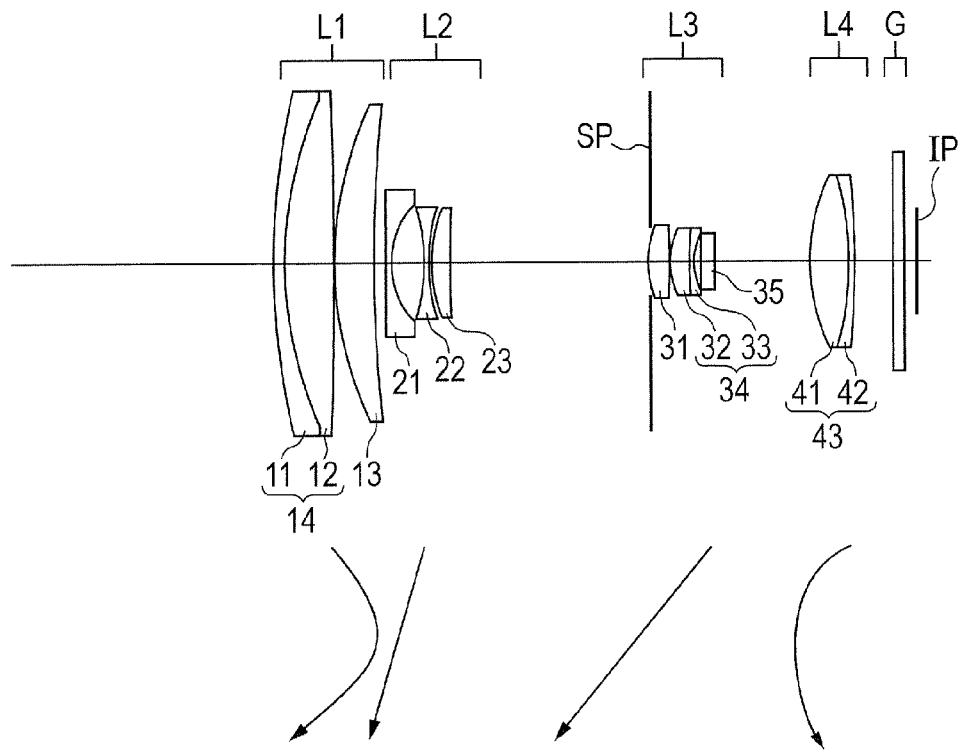
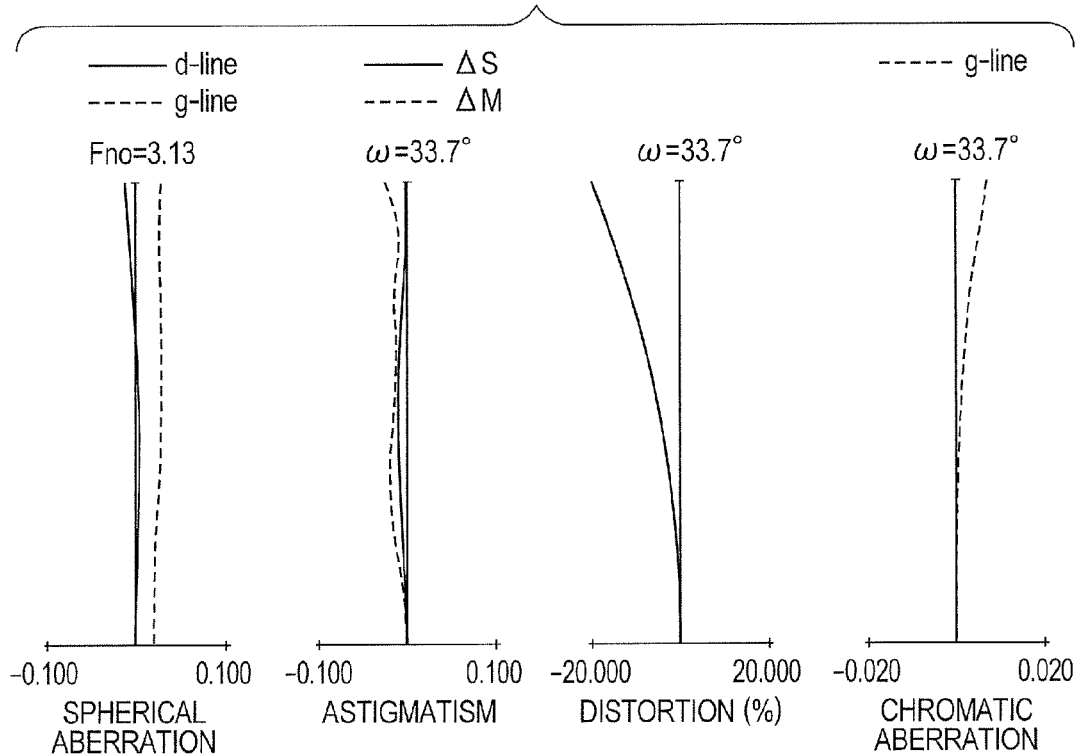

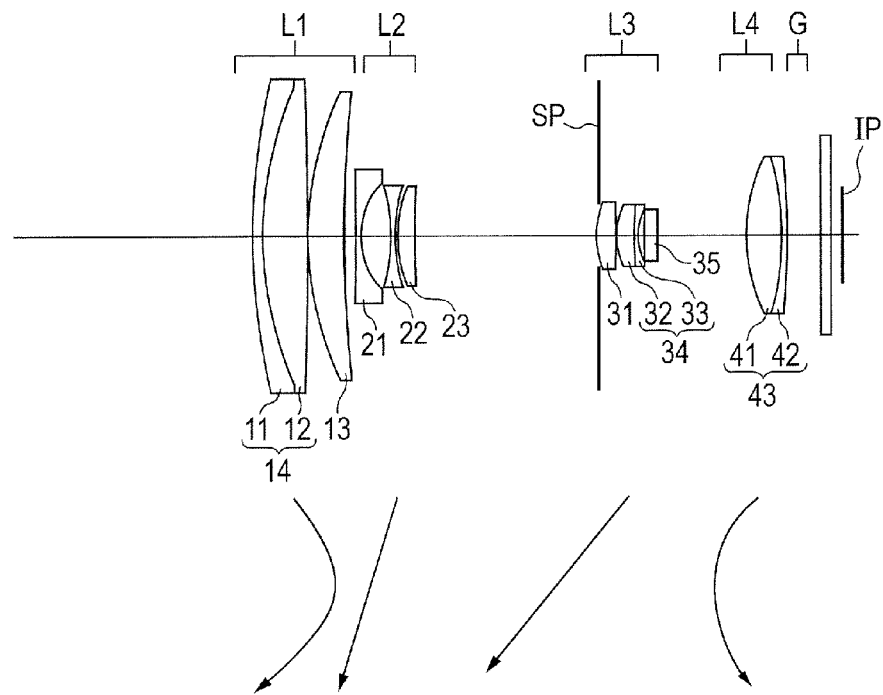
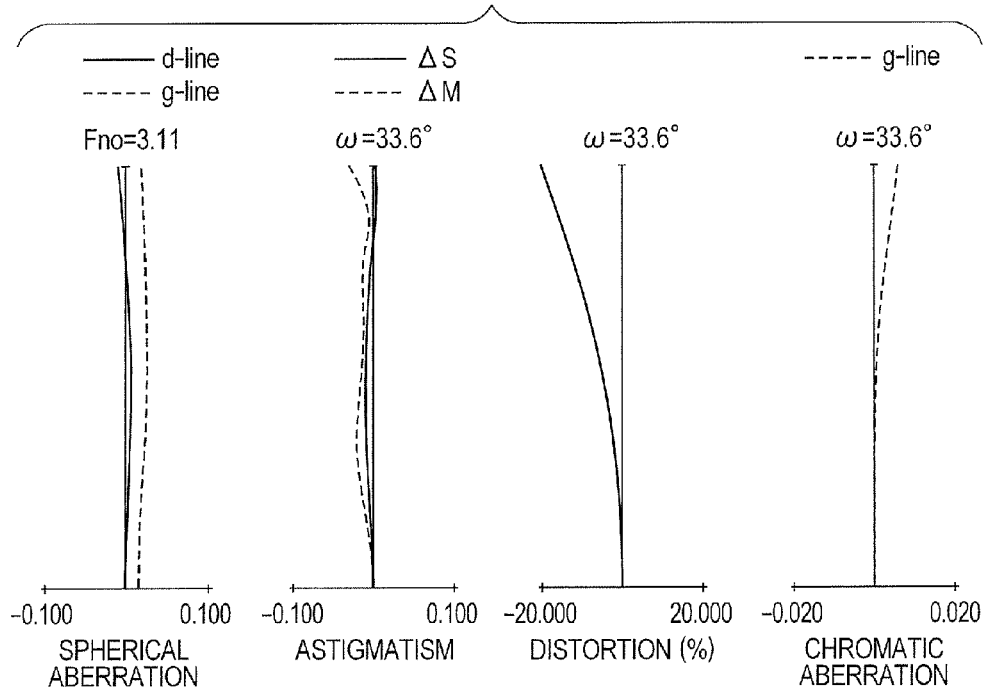

ZOOM LENS AND IMAGE PICKUP APPARATUS USING THE SAME

BACKGROUND OF THE INVENTION

1. Field of the Invention

The present invention relates to a zoom lens and an image pickup apparatus using the same. The present invention can suitably be applied to a video camera, a digital camera, a television camera, a monitoring camera, and a film camera.

2. Description of the Related Art

With improvements in performance and functionality of image pickup apparatuses using solid-state image pickup elements, reduction in the overall apparatus size has been achieved in recent years. As image optical systems used in such image pickup apparatuses, zoom lenses having a high zoom ratio and excellent optical characteristics throughout the entire zoom range and small in overall size are required.

As zoom lens meeting the above requirements, there has been known a four-unit zoom lens composed of first to fourth lens units respectively having positive, negative, positive, and positive refractive powers in order from the object side to the image side, which are moved for zooming.

Japanese Patent Application Laid-Open No. 2009-098449 discloses a zoom lens of which the second lens unit is composed of three lenses and the third lens unit is composed of three lenses. This zoom lens has a zoom ratio of 21.0 and an angle of view of approximately 80 to 85 degrees at the wide angle end. Japanese Patent Application Laid-Open No. 2012-048033 discloses a zoom lens of which the second lens unit is composed of three lenses and the third lens unit is composed of four lenses. This zoom lens has a zoom ratio of 17.8 and an angle of view of approximately 90 degrees at the wide angle end.

To reduce the size of a zoom lens, it is preferred, typically, to increase the refractive powers of the lens units constituting the zoom lens, reduce the amount of shift of each lens unit with zooming, and to reduce the number of lenses in each lens unit. However, if the zoom lens is designed in this way, aberration variation with zooming will be increased, making it difficult to achieve excellent optical characteristics throughout the entire zoom range.

Therefore, to achieve reduction in the overall size of a zoom lens and high zoom ratio while keeping excellent optical characteristics, it is important to appropriately design the magnification variation provided by each lens unit in the zoom lens and the refractive power and the lens configuration of each lens unit.

For example, in the case of the above-described four-unit zoom lens, it is important to appropriately design the refractive power and the lens configuration of each of the lens units that move for zooming. It is particularly important to appropriately design the configuration of the third lens unit and the imaging magnification (lateral magnification) of the third lens unit at the wide angle end and at the telephoto end. If these factors are inappropriate, it is difficult to provide a zoom lens that is small in size and has excellent optical characteristics while having a high zoom ratio.

SUMMARY OF THE INVENTION

A zoom lens comprising, in order from an object side to an image side: a first lens unit having a positive refractive power; a second lens unit having a negative refractive power; a third lens unit having a positive refractive power; and a fourth lens unit having a positive refractive power, wherein the lens units move during zooming from the wide angle end to the telephoto end, the first lens unit consists of three or less lenses, the second lens unit consists of four or less lenses, the third lens unit consists of four or less lenses, the fourth lens unit consists of two or less lenses, and the zoom lens satisfies the following conditional expressions:

$$2.65 < \beta 3t/\beta 3w < 10.00, \text{ and}$$

$$0.05 < f3/ft < 0.14,$$

where $\beta 3w$ is the lateral magnification of the third lens unit at the wide angle end, $\beta 3t$ is the lateral magnification of the third lens unit at the telephoto end, f3 is the focal length of the third lens unit, and ft is the focal length of the entire system at the telephoto end.

Further features of the present invention will become apparent from the following description of exemplary embodiments with reference to the attached drawings.

BRIEF DESCRIPTION OF THE DRAWINGS

FIG. 1 is a cross sectional view of a zoom lens according to a first numerical embodiment of the present invention.

FIG. 2A includes aberration diagrams of the zoom lens according to the first numerical embodiment of the present invention at the wide angle end.

FIG. 5 is a cross sectional view of a zoom lens according to a third numerical embodiment of the present invention.

FIG. 6A includes aberration diagrams of the zoom lens according to the third numerical embodiment of the present invention at the wide angle end.

FIG. 7 is a cross sectional view of a zoom lens according to a fourth numerical embodiment of the present invention.

FIG. 8A includes aberration diagrams of the zoom lens according to the fourth numerical embodiment of the present invention at the wide angle end.

DESCRIPTION OF THE EMBODIMENTS

Preferred embodiments of the present invention will now be described in detail in accordance with the accompanying drawings. The zoom lens according to the present invention comprises, in order from the object side to the image side, a first lens unit having a positive refractive power, a second lens unit having a negative refractive power, a third lens unit having a positive refractive power, and a fourth lens unit having a positive refractive power. The lens units move during zooming from the wide angle end to the telephoto end. The first lens unit consists of three or less lenses. The second lens unit consists of four or less lenses. The third lens unit consists of four or less lenses. The fourth lens unit consists of two or less lenses.

Figure 2B:
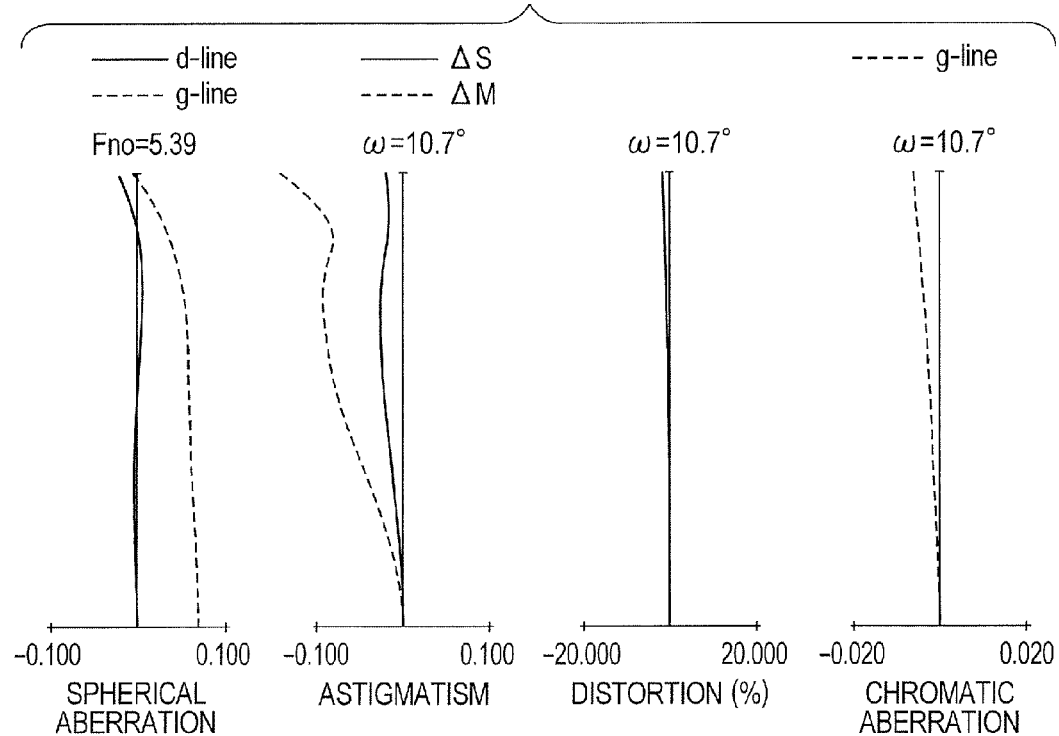
FIG. 2B includes aberration diagrams of the zoom lens according to the first numerical embodiment of the present invention at an intermediate zoom position.
Figure 2C:
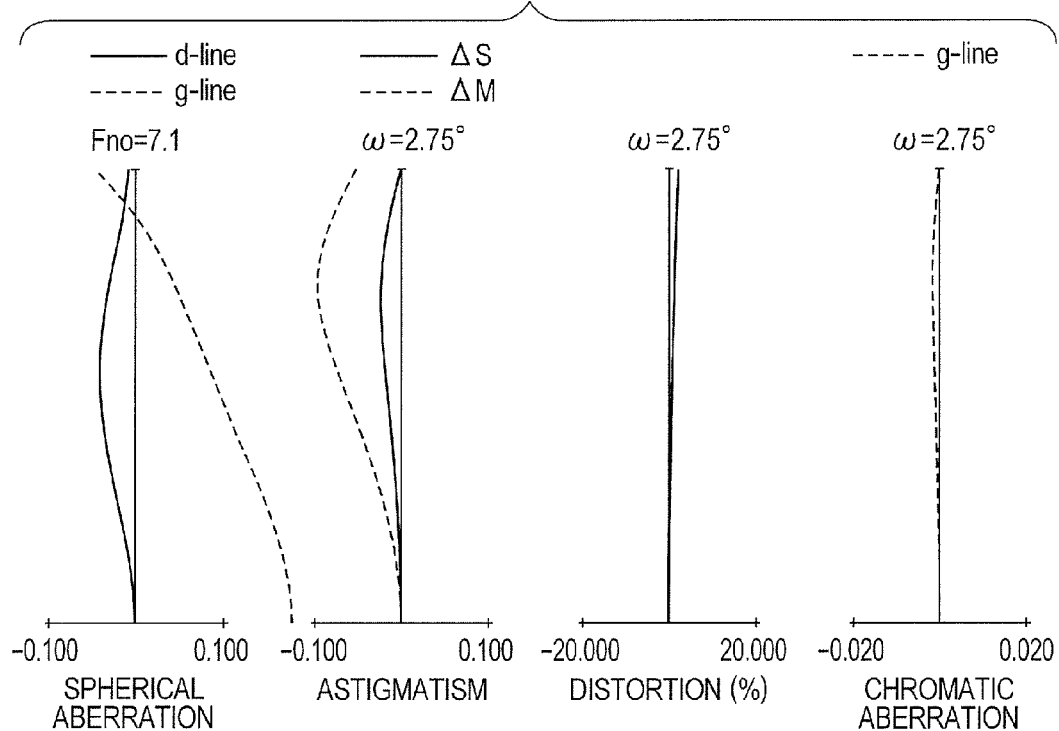
FIG. 2C includes aberration diagrams of the zoom lens according to the first numerical embodiment of the present invention at the telephoto end.

FIG. 1 is a cross sectional view of a zoom lens according to a first embodiment of the present invention at the wide angle end (in the shortest focal length state). FIGS. 2A, 2B, and 2C are aberration diagrams of the zoom lens according to the first embodiment at the wide angle end, at an intermediate zoom position, and at the telephoto end (in the longest focal length state) respectively. The zoom lens of the first embodiment has a zoom ratio of 17.0 and an aperture ratio of 3.92 to 7.10.

Figure 3:
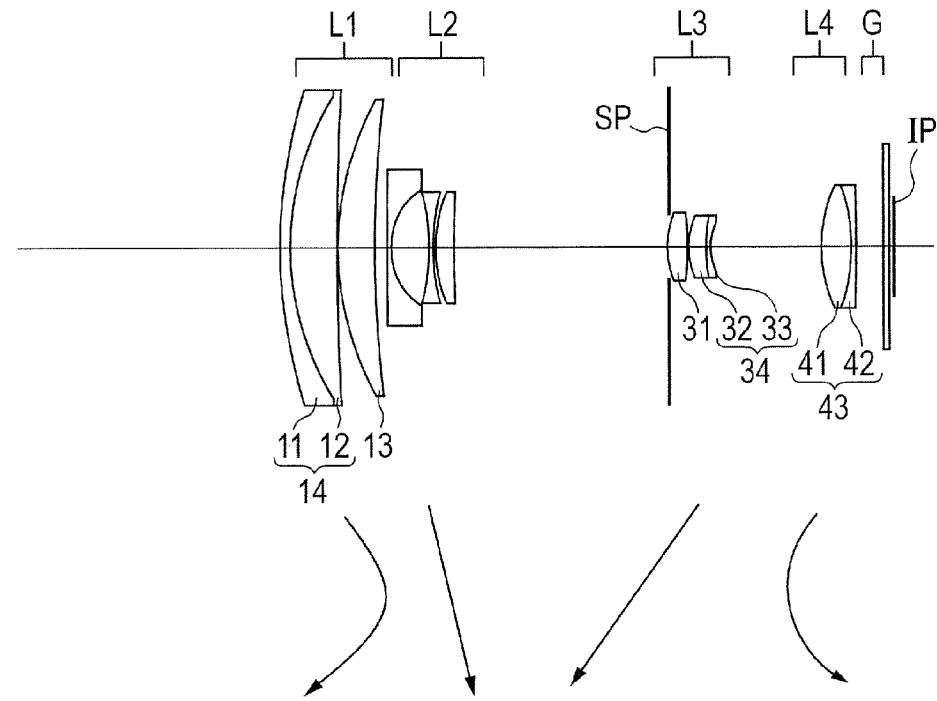
FIG. 3 is a cross sectional view of a zoom lens according to a second numerical embodiment of the present invention.
Figure 4A:
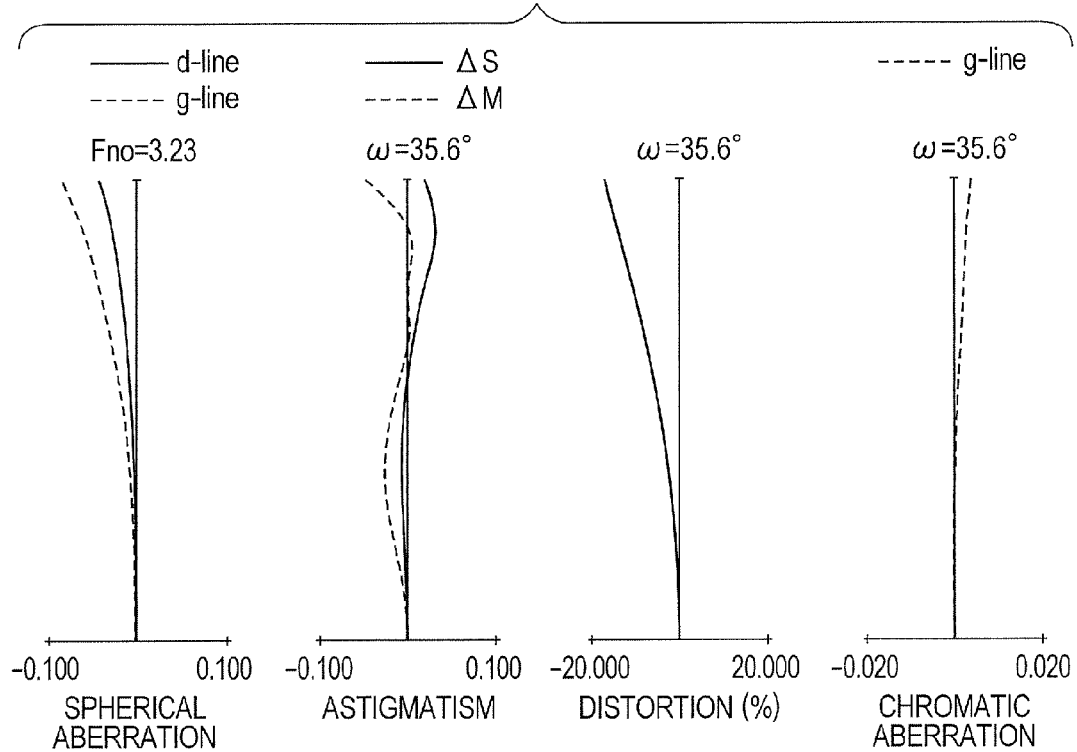
FIG. 4A includes aberration diagrams of the zoom lens according to the second numerical embodiment of the present invention at the wide angle end.
Figure 4B:
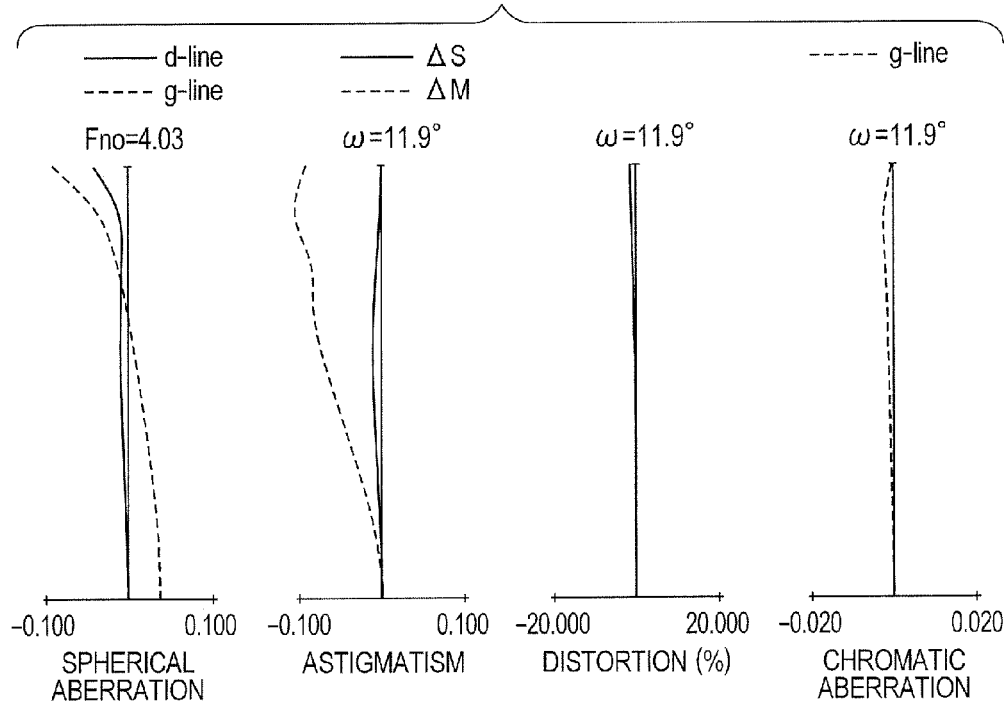
FIG. 4B includes aberration diagrams of the zoom lens according to the second numerical embodiment of the present invention at an intermediate zoom position.
Figure 4C:
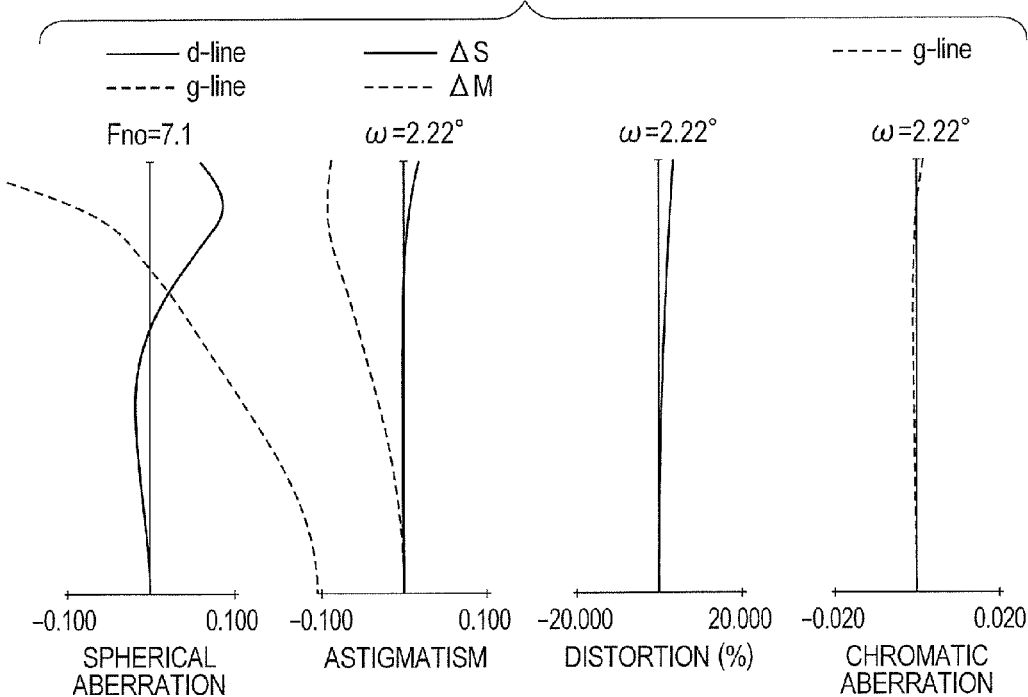
FIG. 4C includes aberration diagrams of the zoom lens according to the second numerical embodiment of the present invention at the telephoto end.

FIG. 3 is a cross sectional view of a zoom lens according to a second embodiment of the present invention at the wide angle end. FIGS. 4A, 4B, and 4C are aberration diagrams of the zoom lens according to the second embodiment at the wide angle end, at an intermediate zoom position, and at the telephoto end respectively. The zoom lens of the second embodiment has a zoom ratio of 21.3 and an aperture ratio of 3.23 to 7.10.

Figure 6B:
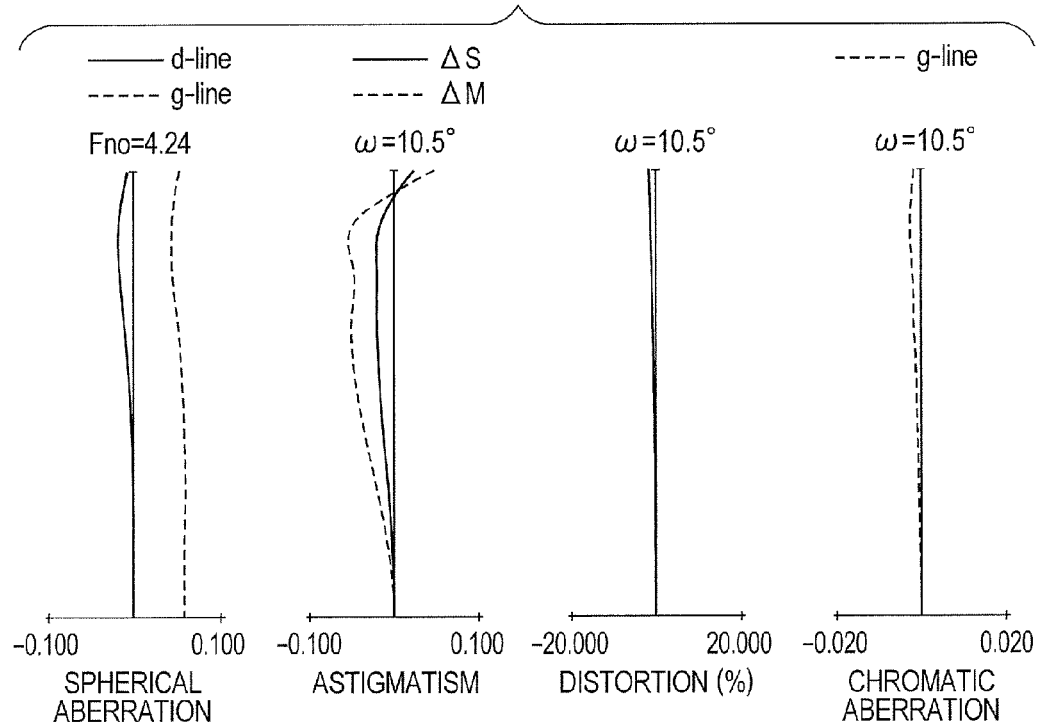
FIG. 6B includes aberration diagrams of the zoom lens according to the third numerical embodiment of the present invention at an intermediate zoom position.
Figure 6C:
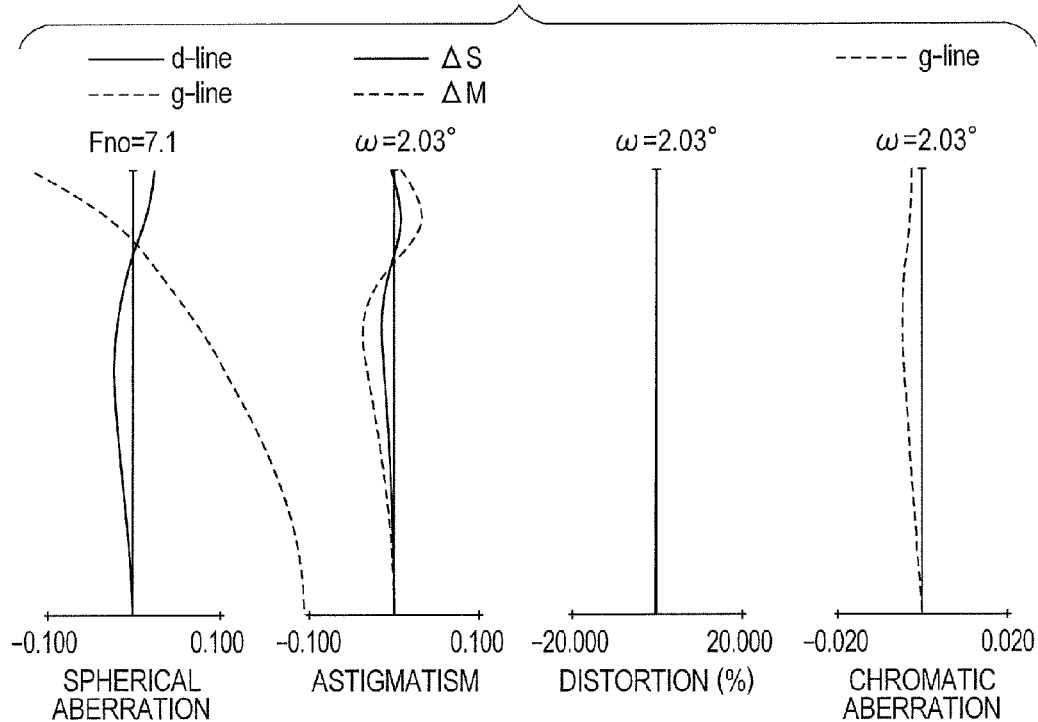
FIG. 6C includes aberration diagrams of the zoom lens according to the third numerical embodiment of the present invention at the telephoto end.

FIG. 5 is a cross sectional view of a zoom lens according to a third embodiment of the present invention at the wide angle end. FIGS. 6A, 6B, and 6C are aberration diagrams of the zoom lens according to the third embodiment at the wide angle end, at an intermediate zoom position, and at the telephoto end respectively. The zoom lens of the third embodiment has a zoom ratio of 23.1 and an aperture ratio of 3.13 to 7.10.

Figure 8B:
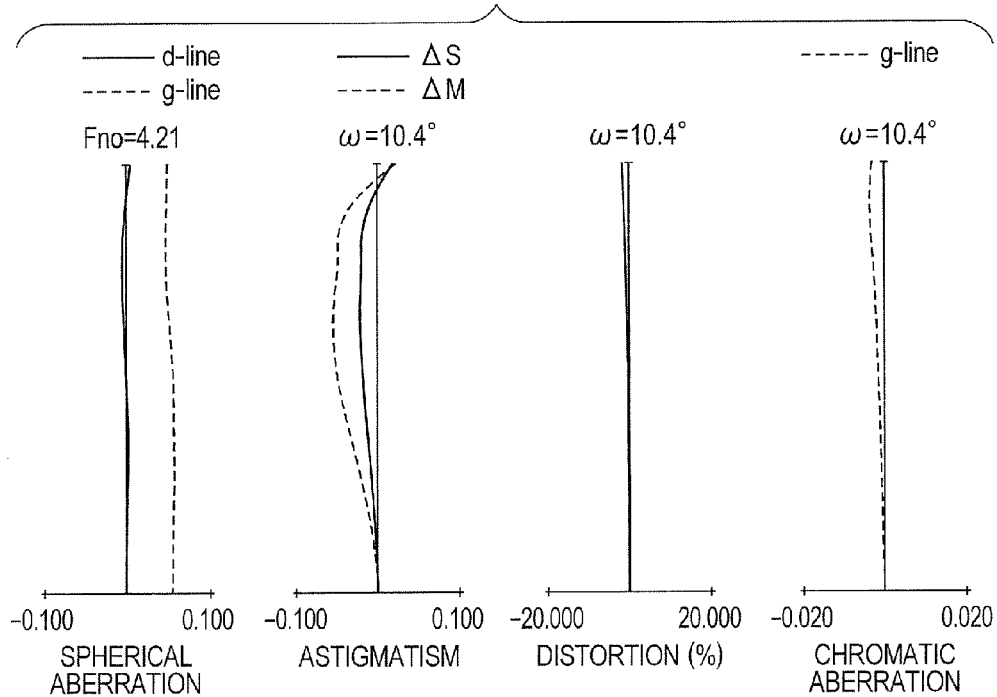
FIG. 8B includes aberration diagrams of the zoom lens according to the fourth numerical embodiment of the present invention at an intermediate zoom position.
Figure 8C:
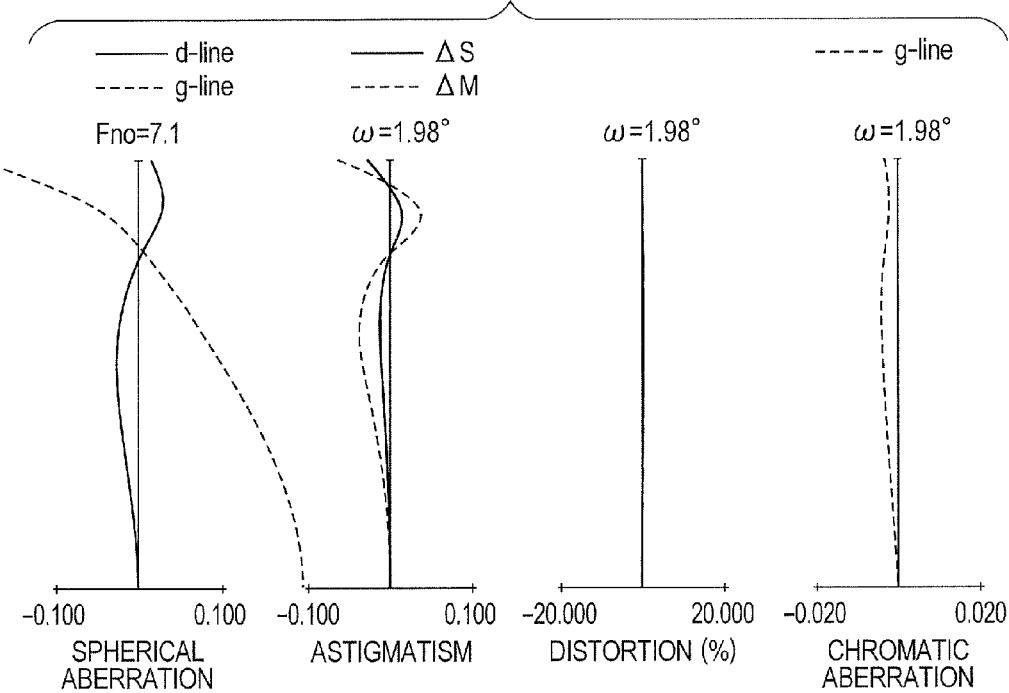
FIG. 8C includes aberration diagrams of the zoom lens according to the fourth numerical embodiment of the present invention at the telephoto end.

FIG. 7 is a cross sectional view of a zoom lens according to a fourth embodiment of the present invention at the wide angle end. FIGS. 8A, 8B, and 8C are aberration diagrams of the zoom lens according to the fourth embodiment at the wide angle end, at an intermediate zoom position, and at the telephoto end respectively. The zoom lens of the fourth embodiment has a zoom ratio of 23.7 and an aperture ratio of 3.11 to 7.10.

Figure 9:
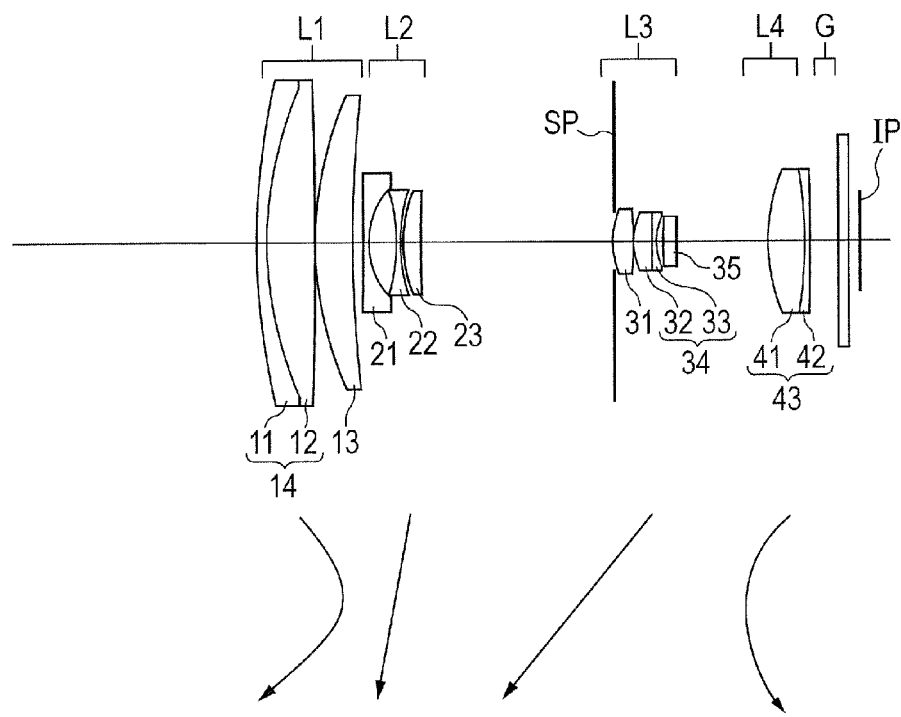
FIG. 9 is a cross sectional view of a zoom lens according to a fifth numerical embodiment of the present invention.
Figure 10A:
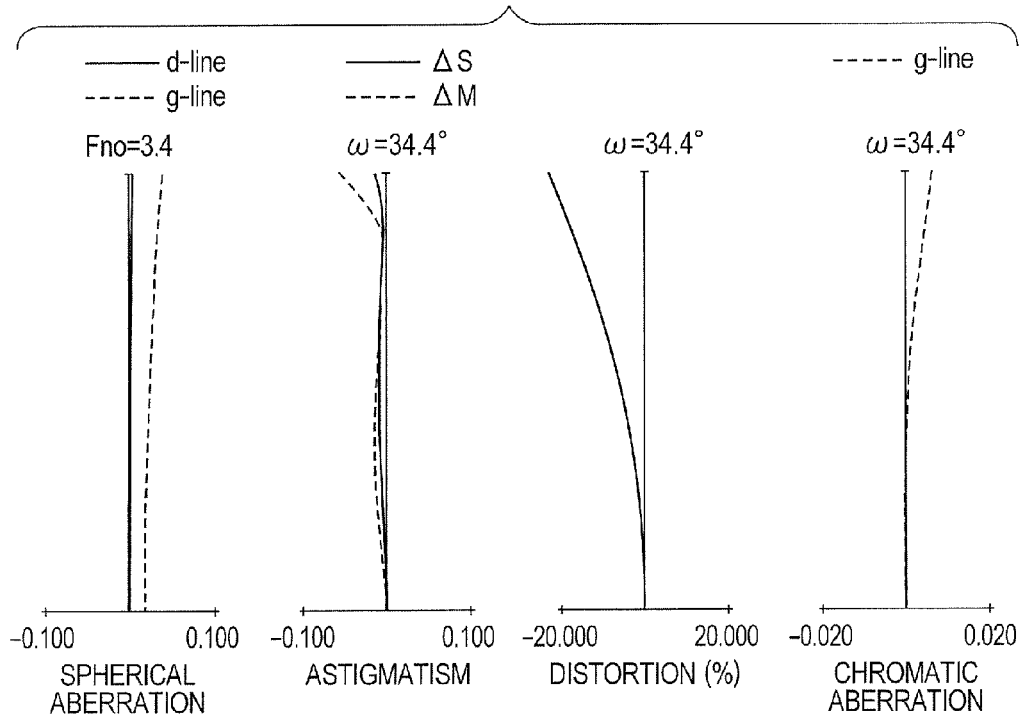
FIG. 10A includes aberration diagrams of the zoom lens according to the fifth numerical embodiment of the present invention at the wide angle end.
Figure 10B:
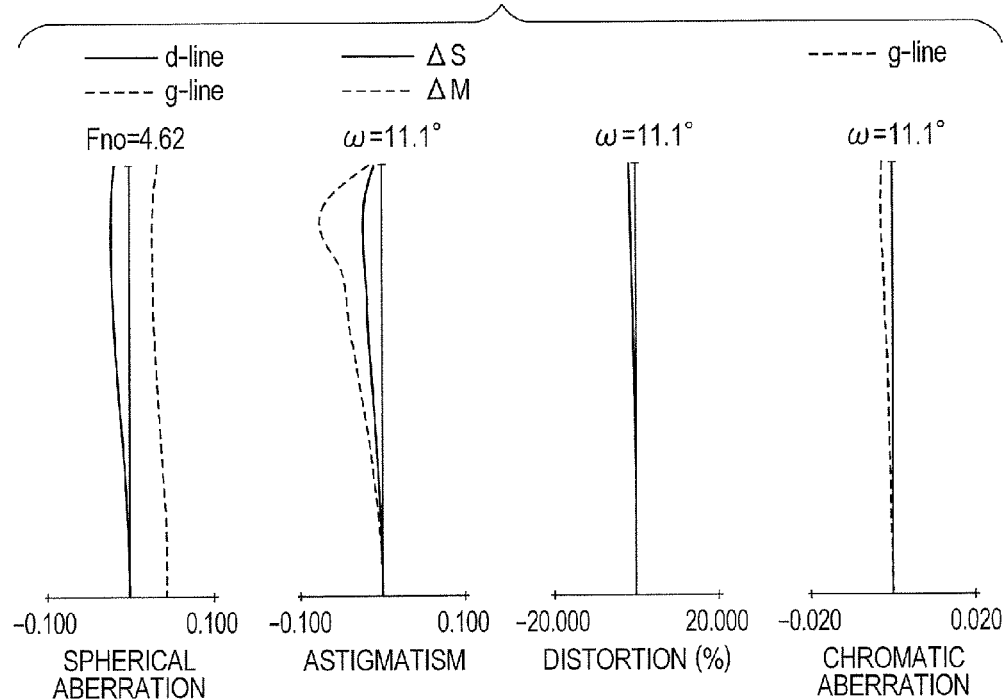
FIG. 10B includes aberration diagrams of the zoom lens according to the fifth numerical embodiment of the present invention at an intermediate zoom position.
Figure 10C:
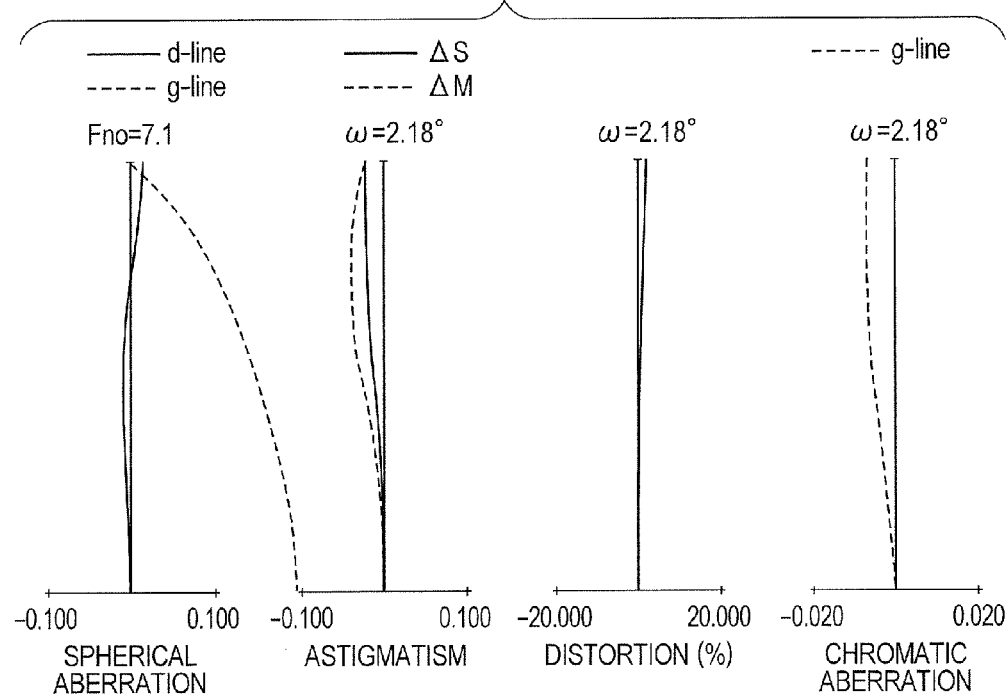
FIG. 10C includes aberration diagrams of the zoom lens according to the fifth numerical embodiment of the present invention at the telephoto end.

FIG. 9 is a cross sectional view of a zoom lens according to a fifth embodiment of the present invention at the wide angle end. FIGS. 10A, 10B, and 10C are aberration diagrams of the zoom lens according to the fifth embodiment at the wide angle end, at an intermediate zoom position, and at the telephoto end respectively. The zoom lens of the fifth embodiment has a zoom ratio of 22.2 and an aperture ratio of 3.40 to 7.10.

Figure 11:
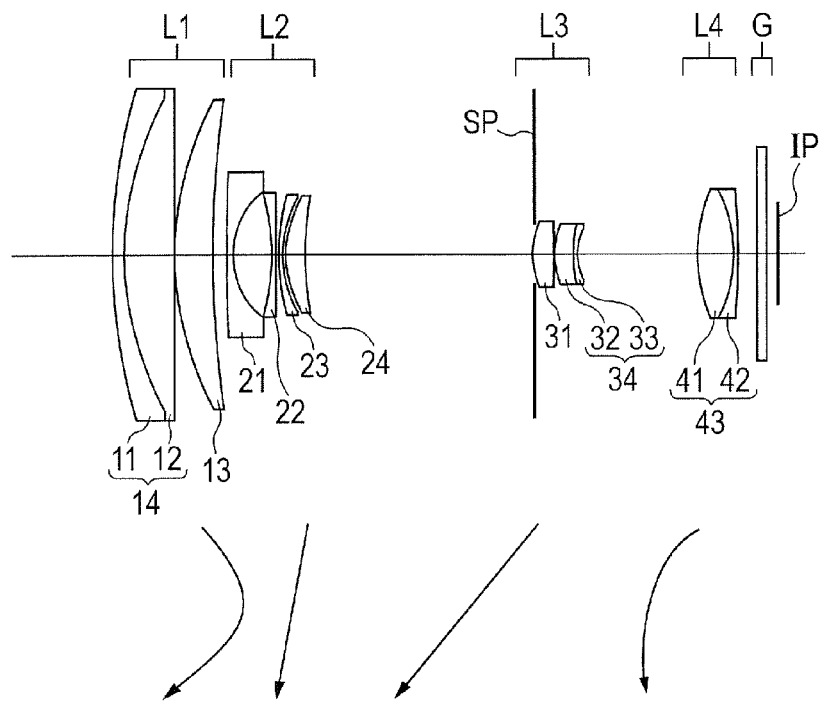
FIG. 11 is a cross sectional view of a zoom lens according to a sixth numerical embodiment of the present invention.
Figure 12A:
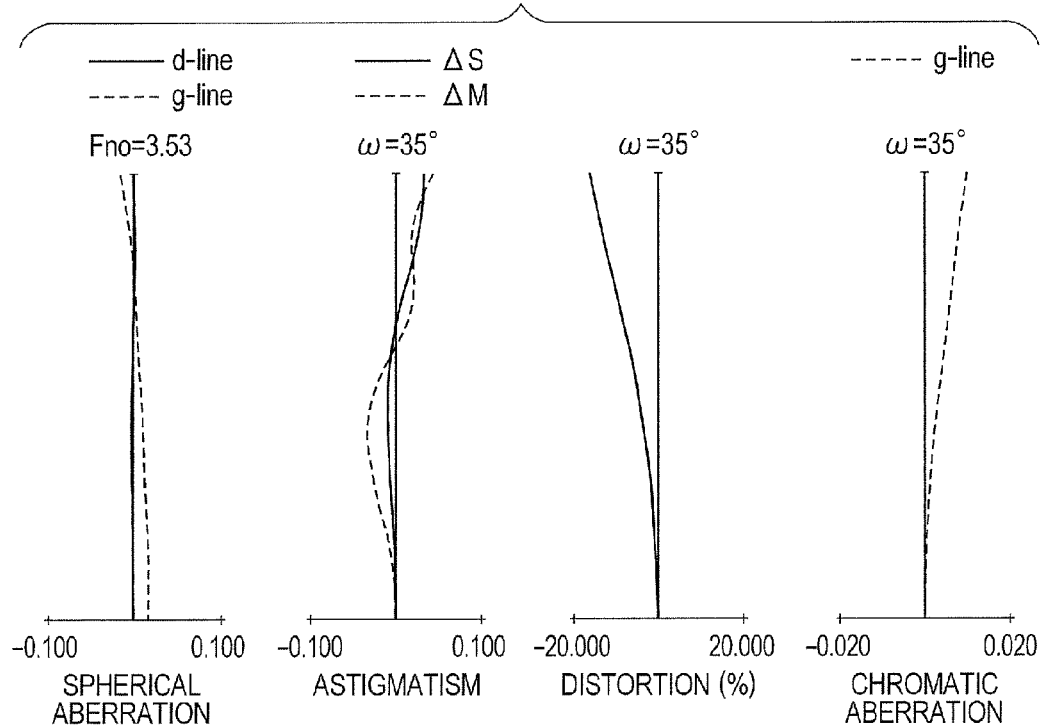
FIG. 12A includes aberration diagrams of the zoom lens according to the sixth numerical embodiment of the present invention at the wide angle end.
Figure 12B:
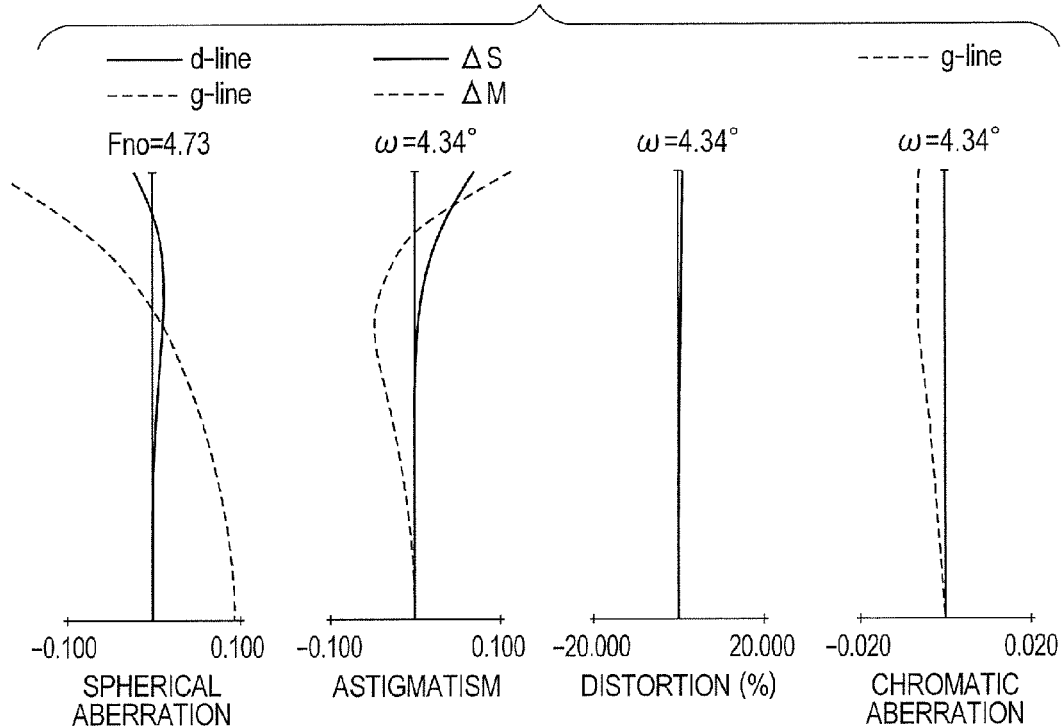
FIG. 12B includes aberration diagrams of the zoom lens according to the sixth numerical embodiment of the present invention at an intermediate zoom position.
Figure 12C:
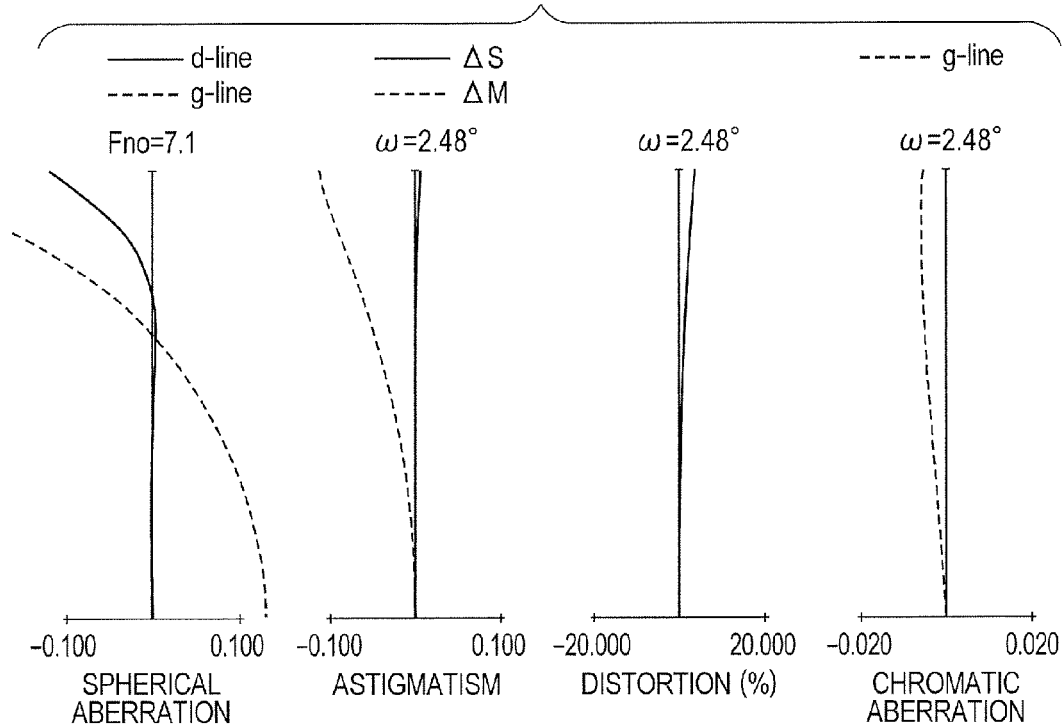
FIG. 12C includes aberration diagrams of the zoom lens according to the sixth numerical embodiment of the present invention at the telephoto end.

FIG. 11 is a cross sectional view of a zoom lens according to a sixth embodiment of the present invention at the wide angle end. FIGS. 12A, 12B, and 12C are aberration diagrams of the zoom lens according to the sixth embodiment at the wide angle end, at an intermediate zoom position, and at the telephoto end respectively. The zoom lens of the sixth embodiment has a zoom ratio of 18.7 and an aperture ratio of 3.53 to 7.10.

Figure 13:
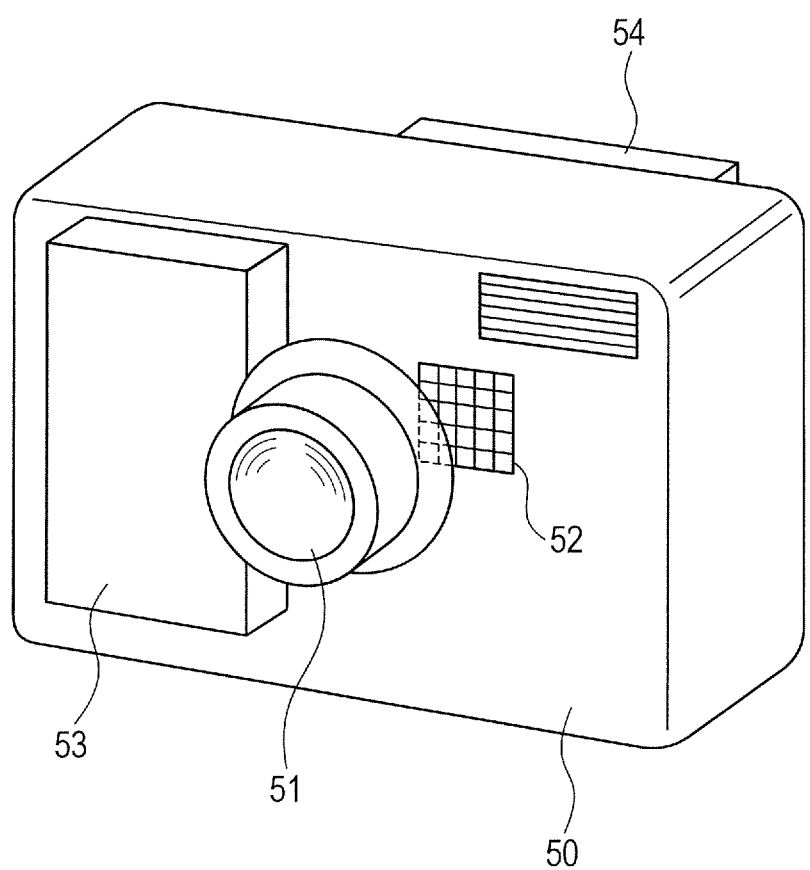
FIG. 13 is a diagram showing relevant portions of an optical device according to the present invention.

FIG. 13 is a schematic diagram showing relevant portions of a camera (image pickup apparatus) equipped with a zoom lens according to the present invention. The zoom lenses according to the embodiments are image lens systems used in image pickup apparatuses such as video cameras, digital cameras, and film cameras. In the cross sectional views of the zoom lenses, the left side is the object side (front side), and the right side is the image side (rear side. The cross sectional views of the zoom lenses show the lens units Li, where i is the lens unit number counted from the object side, namely the lens unit Li is the i-th lens unit.

The cross sectional view of the zoom lenses show the first lens unit L1 having a positive refractive power, the second lens unit L2 having a negative refractive power, a third lens unit L3 having a positive refractive power, and a fourth lens unit L4 having a negative refractive power. The zoom lenses according to the embodiments are four-unit zoom lenses. The cross sectional views of the zoom lenses also show an F-number determining member SP functioning as an aperture stop that determines (or defines) full-aperture F-number (Fno) beams. (This member will be hereinafter referred to as the "aperture stop".) The position of the aperture stop SP with respect to the optical axis direction is between the object side surface vertex of the lens 31 closest to the object side in the third lens unit L3 and the intersection of the object side surface of the lens 31 and the outer circumferential edge of the same lens 31.

The zoom lenses also have an optical block G including an optical filter(s), face plate, crystal low pass filter, and infrared cut filter etc. The cross sectional views also show the image plane IP, at which the image pickup surface of a solid-state image pickup element (photo-electric conversion element) such as a CCD sensor or CMOS sensor is arranged, in cases where the zoom lens is used as an image optical system of a video camera or a digital camera. In cases where the zoom lens is used as image optical system of a film camera, the film surface or the photosensitive surface is arranged.

The allows in the cross sectional views represent the loci of movement of the lens units during zooming from the wide angle end to the telephoto end. In the diagrams of spherical aberration, the solid line d-line represents spherical aberration for the d-line, and the chain double-dashed line g-line represents spherical aberration for the g-line. In the aberration diagrams of astigmatism, the dot line ΔM represents astigmatism in a meridional plane, and the solid line ΔS represents astigmatism in a saggital plane. Chromatic aberration of magnification is for the g-line. In the aberration diagrams, the half angle of field ω (half of the imaging angle) and the F-number Fno are also shown. In the following embodiments, the terms "wide angle end" and the "telephoto end" refer to the zoom positions which are assumed when the magnification changing lens units (variator, the second lens unit L2 in each embodiment) are located at both ends of their mechanically movable ranges along the optical axis.

In each of the embodiment, during zooming from the wide angle end to the telephoto end, the first, second, third, and fourth lens units L1, L2, L3, L4 move in the manner represented by the arrows. Specifically, during zooming from the wide angle end to the telephoto end, the first lens unit L1 moves (non-linearly) along a locus convex to the image side, the second lens unit L2 moves toward the image side or the object side, the third lens unit L3 moves toward the object side, and the fourth lens unit L4 moves along a locus convex to the object side. Focusing operation is performed by moving the first lens unit L1 and the fourth lens unit L4.

In each of the embodiments, the first lens unit L1 includes three or less lenses, the second lens unit L2 includes four or less lenses, the third lens unit L3 includes four or less lenses, and the fourth lens unit L4 includes two or less lenses. The zoom lens satisfies the following conditional expressions:

$$2.65<\beta 3t/\beta 3w<10.00 \tag{1}$$

and $$0.05<f3/ft<0.14, \tag{2}$$

where β3w is the lateral magnification of the third lens unit L3 at the wide angle end, β3t is the lateral magnification of the third lens unit L3 at the telephoto end, f3 is the focal length of the third lens unit L3, and ft is the focal length of the entire system at the telephoto end.

In the zoom lens according to the present invention, the magnification change ratio of the third lens unit L3 is high. This allows a reduction in the magnification variation provided by expanding the distance between the first lens unit L1 and the second lens unit L2, leading to a reduction in the amount of shift of the first lens unit L1 and the amount of shift of the second lens unit L2 during zooming. Moreover, by appropriately specifying the focal length (the inverse of the refractive power) of the third lens unit L3, the amount of shift of the third lens unit L3, which is designed to have a high magnification change ratio in zooming, is made smaller so that the overall length of the zoom lens at the telephoto end is reduced.

Conditional expression (1) limits the range of the magnification change ratio (the ratio of the lateral magnifications) of the third lens unit L3 during zooming. If the magnification change ratio of the third lens unit L3 is so large that its value exceeds the upper limit of conditional expression (1), astigmatism is generated greatly in the third lens unit L3, leading to large variation in astigmatism with zooming. Then, it is difficult to achieve excellent optical characteristics throughout the entire zoom range. On the other hand, if the magnification change ratio of the third lens unit L3 is so small that its value falls below the lower limit of conditional expression (1), the first lens unit L1 and the second lens unit L2 are required to provide large magnification change in order to achieve a high zoom ratio, leading to a large overall length of the zoom lens at the telephoto end, if the same zoom ratio is to be maintained. This is undesirable.

Conditional expression (2) limits the range of the focal length of the third lens unit L3. If the value of f3/ft in conditional expression (2) exceeds the upper limit, the amount of shift of the third lens unit L3 is required to be unduly large in order to make the magnification change ratio of the third lens unit L3 high. Then, providing a space allowing the third lens unit L3 to shift leads to a large overall length of the zoom lens. On the other hand, if the refractive power of third lens unit L3 is so high that the value of f3/ft in conditional expression (2) falls below the lower limit, a large amount of spherical aberration at the undercorrected side is generated at the wide angle end.

Having the above-described configuration and satisfying conditional expressions (1) and (2), the zoom lens can have a high zoom ratio, a reduced overall length at the telephoto end, and high resolving power throughout the entire zoom range. It is more preferred that the numerical ranges of conditional expressions (1) and (2) be further limited as follows:

$$2.7<\beta 3t/\beta 3w<8.0 \tag{1a}$$

and $$0.050<f3/ft<0.135, \tag{2a}$$

It is still more preferred that the numerical ranges of conditional expressions (1a) and (2a) be further limited as follows.

$$2.75<\beta 3t/\beta w<6.00 \tag{1b}$$

and $$0.060<f3/ft<0.135, \tag{2b}$$

As described above, the embodiments provide four-unit zoom lenses each of which has a high zoom ratio, is short in the overall length at the telephoto end, and has high resolving power.

It is more preferred that the zoom lens according to the present invention satisfy one or more of the following conditional expressions. In the following conditional expressions, f3n is the focal length of a negative lens included in the third lens unit L3 (if the negative lens is cemented with other lens(es), f3n is the focal length of the negative lens in a stand-alone state separated from the other lenses and placed in the air), N3n is the refractive index of the material of the negative lens included the third lens unit L3, f3pave is the average of the focal lengths of two or more positive lenses included in the third lens unit L3, and N3pave is the average of the refractive indexes of the two or more positive lenses included in the third lens unit L3.

Moreover, f1 is the focal length of the first lens unit L1, f2 is the focal length of the second lens unit L2, f4 is the focal length of the fourth lens unit L4, and fw is the focal length of the entire lens system at the wide angle end. It is preferred that one or more of the following conditional expressions concerning the values symbolized as above be satisfied.

$$0.20<|f3n|/f3<0.55 \tag{3}$$

$$1.850<N3n<2.500 \tag{4}$$

$$0.50<f3pave/f3<1.55 \tag{5}$$

$$1.690<N3pave<2.500 \tag{6}$$

$$0.30<f1/ft<0.50 \tag{7}$$

$$0.50<|f2|/fw<1.35 \tag{8}$$

$$3.0<f4/fw<5.0 \tag{9}$$

In the following, the technical meaning of the above conditional expressions will be described.

If the refractive power of the negative lens in the third lens unit L3 is so low (namely, if the absolute value of its negative refractive power is so low) that the value of |f3n|/f3 in conditional expression (3) exceeds the upper limit, negative curvature of field increases over the entire zoom range. On the other hand, if the refractive power of the negative lens in the third lens unit L3 is so high (namely, if the absolute value of its negative refractive power is so high) that the value of |f3n|/f3 in conditional expression (3) falls below the lower limit, the positive refractive power of the third lens unit L3 becomes low, necessitating a large amount of shift of the third lens unit L3 during zooming, leading to a large overall length of the zoom lens at the telephoto end.

If the refractive index of the material of the negative lens is so large as to exceed the upper limit of conditional expression (4), the Petzval sum increases in the positive direction, leading to insufficiency in cancelling the Petzval sum thus increased and to an increased curvature of field at the undercorrected side over the entire zoom range. On the other hand, if the refractive index of the negative lens is so small as to fall below the lower limit of conditional expression (4), the curvature of the lens surfaces of the negative lens becomes too high, leading to large coma over the entire zoom range, which is difficult to correct.

If the value of f3pave/f3 in conditional expression (5) exceeds the upper limit, the refractive power of the positive lenses included in the third lens unit L3 is too low, necessitating a large amount of shift of the third lens unit L3 for zooming. This leads to an undesirably large overall length of the zoom lens at the telephoto end. On the other hand, if the value of f3pave/f3 in conditional expression (5) falls below the lower limit, the refractive power of the positive lenses included in the third lens unit L3 is too high, leading to large spherical aberration at the undercorrected side at the wide angle end, which is difficult to correct.

If the value of N3pave in conditional expression (6) exceeds the upper limit, the Petzval sum increases in the negative direction, leading to insufficiency in cancelling the Petzval sum thus increased and to an increased curvature of field at the undercorrected side over the entire zoom range, which is difficult to correct. On the other hand, if the value of N3pave in conditional expression (6) falls below the lower limit, the curvature of the lens surfaces of the positive lenses becomes too high, leading to large spherical aberration at the undercorrected side over the entire zoom range, which is difficult to correct.

If the refractive power of the first lens unit L1 is so low that the value of f1/ft in conditional expression (7) exceeds the upper limit, the amount of shift of the first lens unit L1 is necessitated to be large if a high zoom ratio is to be achieved. In consequence, the overall length of the zoom lens at the telephoto end becomes large. On the other hand, if the refractive power of the first lens unit L1 is so high that the value of f1/ft in conditional expression (7) falls below the lower limit, large spherical aberration and curvature of field at the undercorrected side are generated at the telephoto end, and it is difficult to correct spherical aberration and curvature of field.

If the negative refractive power of the second lens unit L2 is so low (namely, if the absolute value of its negative refractive power is so low) that the value of |f2|/fw in conditional expression (8) exceeds the upper limit, the amount of shift of the second lens unit L2 is necessitated to be too large if a high zoom ratio is to be achieved. This leads to an increase in the overall length of the zoom lens at the telephoto end. On the other hand, if the negative refractive power of the second lens unit L2 is so high (namely, if the absolute value of its negative refractive power is so high) that the value of |f2|/fw in conditional expression (8) falls below the lower limit, chromatic aberration of magnification for the g-line at the undercorrected side increases at the wide angle end to become hard to correct.

If the positive refractive power of the fourth lens unit L4 is so low that the value of f4/fw in conditional expression (9) exceeds the upper limit, the back focus becomes large, leading to an increase in the overall length of the zoom lens. On the other hand, if the positive refractive power of the fourth lens unit L4 is so high that the value of f4/fw in conditional expression (9) falls below the lower limit, the variation of the angle of incidence of rays incident on the image pickup surface with zooming becomes large, leading to large color shading. It is more preferred that the numerical ranges of conditional expressions (3) to (9) be further limited as follows.

$$0.35 < |f3n|/f3 < 0.55 \tag{3a}$$

$$1.950 < N3n < 2.300 \tag{4a}$$

$$0.600 < f3pave/f3 < 1.540 \tag{5a}$$

$$1.695 < N3pave < 2.300 \tag{6a}$$

$$0.35 < f1/ft < 0.45 \tag{7a}$$

$$0.6 < |f2|/fw < 1.3 \tag{8a}$$

$$3.5 < f4/fw < 4.5 \tag{9a}$$

As per the above, the zoom lens according to the embodiments are each composed of a reduced number of lenses, and the magnification variation and the refractive power of each lens unit are appropriately specified. Thus, there are provided zoom lenses each of which has a high zoom ratio, is short in overall length at the telephoto end, and has high resolving power.

In cases where the zoom lens according to the present invention is used in an image pickup apparatus having an image pickup element, it is preferred that a system for correcting electrical signals of images having distortion and chromatic aberration of magnification by image processing be employed. This is helpful in achieving more excellent performance throughout the entire zoom range.

Now, the embodiments of the zoom lens according to the present invention will be described. In the zoom lenses according to the embodiments of the present invention, all the lens units move during zooming from the wide angle end to the telephoto end.

Specifically, during zooming from the wide angle end to the telephoto end, the first lens unit L1 moves along a locus convex to the image side and is located closer to the object side at the telephoto end than at the wide angle end. The second lens unit L2 moves toward the image side in the first and second embodiments and moves toward the object side in the third to sixth embodiments. The third lens unit L3 moves toward the object side. The fourth lens unit L4 moves along a locus convex to the object side. The fourth lens unit L4 is located closer to the object side at the telephoto end than at the wide angle end in the first and third to sixth embodiments and located closer to the image side at the telephoto end than at the wide angle end in the second embodiment.

The lens units L1, L2, L3, L4 move in such a way that the distance between the first lens unit L1 and the second lens unit L2 and the distance between the third lens unit L3 and the fourth lens unit L4 are larger at the telephoto end than at the wide angle end and that the distance between the second lens unit L2 and the third lens unit L3 is smaller at the telephoto end than at the wide angle end.

In the zoom lenses according to the embodiments, an F-number determining member (aperture stop) SP is provided between the second lens unit L2 and the third lens unit L3. In the zoom lenses according to the embodiments, the F-number determining member SP moves integrally with (in the same locus with) the third lens unit L3 during the magnification change. With this configuration, abrupt fall-off of light quantity in the region from an intermediate image height to the periphery of the image frame at zoom position at and near the wide angle end is improved. The F-number determining member SP may be adapted to move independently from (along a locus different from) the third lens unit L3 during zooming.

The magnification changing effect in zooming is mainly provided by shifting of the first, second and third lens units L, L2, L3. Change in the focus position with change in the magnification is mainly corrected by shifting of the fourth lens unit L4. Focusing is performed by shifting the fourth lens unit L4 or the first lens unit L1 along the direction of the optical axis.

In the zoom lenses according to the embodiments, to achieve good balance between the focal length (equal to the inverse of the refractive power) and the contribution to the magnification change of each of the lens units, the maximum number of lenses included in each lens unit is three in the first lens unit L1, four in the second lens unit L2, four in the third lens unit L3, and two in the fourth lens unit L4. This leads to a reduction in the overall length of the zoom lens at the telephoto end while achieving a high zoom ratio.

In the following, the configuration of the lens units in zoom lens according to the embodiments will be described. The first lens unit L1 is composed of, in order from the object side to the image side, a cemented lens 14 made up of a negative lens 11 and a positive lens 12 that are cemented together, and a positive meniscus lens 13 having a convex surface facing the object side. With this configuration, the positive refractive power of the first lens unit L1 is shared by the cemented lens 14 and the positive lens 13 and aberrations generated in the first lens unit L1, in particular spherical aberration in the telephoto focal length range, are reduced.

In the zoom lenses according to the first to fifth embodiments, the second lens unit L2 is composed of, in order from the object side to the image side, a negative lens 21 having a concave surface facing the image side of which the absolute value of the refractive power is higher on the image side than on the object side, a biconcave negative lens 22, and a positive lens 23 having a convex surface facing the object side. With this configuration, the negative refractive power of the second lens unit L2 is shared by the two negative lenses, and aberrations generated in the second lens unit L2, in particular curvature of field in the wide angle focal length range and spherical aberration in the telephoto focal length range, are excellently corrected.

In the zoom lens according to the sixth embodiment, the second lens unit L2 is composed of, in order from the object side to the image side, a negative lens 21, a negative lens 22, a negative lens 23, and a positive lens 24. With this configuration, the negative refractive power of the second lens unit L2 is shared by the three negative lenses, and aberrations generated in the second lens unit L2, in particular curvature of field in the wide angle focal length range and spherical aberration in the telephoto focal length range, are excellently corrected. In the zoom lenses according to the first, second, and sixth embodiments, the third lens unit L3 is composed of, in order from the object side to the image side, a positive lens 31 having a convex surface facing the object side, and a cemented lens 34 made up of a positive lens 32 having a convex surface facing the object side and a negative lens 33 having a concave surface facing the image side that are cemented together.

In the zoom lenses according to the third to fifth embodiments, the third lens unit L3 is composed of, in order from the object side to the image side, a positive lens 31 having a convex surface facing the object side, a cemented lens 34 made up of a positive lens 32 having a convex surface facing the object side and a negative lens 33 having a concave surface facing the image side that are cemented together, and a positive lens 35. In the third to fifth embodiments differ from the first and second embodiments in that the positive lens 35 is additionally provided on the image side of the cemented lens 34.

With this configuration, the positive refractive power of the third lens unit L3 is shared by the two positive lenses, and aberrations generated in the third lens unit L3, in particular spherical aberration, coma, and axial chromatic aberration throughout the entire zoom range, are excellently corrected. The fourth lens unit L4 is composed of a cemented lens 43 made up of, in order from the object side to the image side, a positive lens 41 and a negative lens 42 that are cemented together. Constituting the fourth lens unit L4 by the cemented lens 43 helps excellent correction of chromatic aberration of magnification throughout the entire zoom range, even when the fourth lens unit L4 has a high refractive power.

In the zoom lens according to the embodiments, any one of the lens units may be adapted to be shifted in a direction having a component perpendicular to the optical axis to stabilize image. This enables excellent image stabilization.

Next, an embodiment of a digital camera (image pickup apparatus) using a zoom lens according to the present invention as an image optical system will be described with reference to FIG. 13.

In FIG. 13, the digital camera has a digital camera body 50, an image optical system 51 constituted by a zoom lens according to one of the embodiments, an image pickup element 52 such as a CCD sensor configured to receive an image of an object formed by the image optical system 51, recording unit 53 for recording an image of the object picked up by the image pickup element 52, and a liquid crystal display panel 54 with which an object image displayed on a display device (not shown) is observed. By using a zoom lens according to the present invention in an image pickup apparatus such as a digital camera or a video camera, an image pickup apparatus small in size and having excellent optical characteristics is provided. The zoom lens according to the present invention can be applied to a mirror-less single lens reflex camera.

In the following, first to sixth numerical embodiments corresponding to the first to sixth embodiments of the present invention will be described. In the numerical embodiments, there are presented the optical surface number i counted from the object side, the radius of curvature ri of the i-th optical surface, the distance di between the i-th surface and the (i+1)-th surface, the refractive index ndi of the i-th optical member with respect to the d-line, and the Abbe constant vdi of the i-th optical member with respect to the d-line.

The reason why the values of d12 in the first to fifth numerical embodiments and d14 in the sixth numerical embodiment are negative is that the surface numbers are allotted to the aperture stop SP and the third lens unit L3 in this order from the object side to the image side. The aspheric surface shapes are expressed by the following equation:

$$x=(h^2/R)/[1+[1-(1+k)(h/R)^2]^{1/2}]+A4h^4+A6h^6+A8h^8+A10h^{10},$$

where x is the displacement in the direction of the optical axis from the surface vertex at height h from the optical axis, k is eccentricity, A4, A6, A8, and A10 are aspheric coefficients, and R is the paraxial curvature radius.

The expression "e-Z" stands for "$10^{-z}$". In the numerical embodiments, the last two surfaces are surfaces of an optical block such as a filter or a face plate. In the numerical embodiments, the back focus (BF) is the distance from the last lens surface to the paraxial image plane expressed by the equivalent air distance. The overall lens length (OLL) is the distance from the lens surface closest to the object to the last lens surface plus the back focus. Values associated with the conditional expressions described in the foregoing are presented in Table 1 for each of the numerical embodiments.

[Numerical Embodiment 1]
Lengths in the following data are in millimeters.

| Surface data | | | | |
|---|---|---|---|---|
| Surface number | r | d | nd | vd |
| 1 | 38.571 | 0.82 | 2.00100 | 29.1 |
| 2 | 21.791 | 3.50 | 1.49700 | 81.5 |
| 3 | 409.083 | 0.05 | | |
| 4 | 22.576 | 2.90 | 1.71300 | 53.9 |
| 5 | 153.948 | (variable) | | |
| 6* | 269.023 | 0.40 | 1.85135 | 40.1 |
| 7* | 6.049 | 2.80 | | |
| 8 | −16.326 | 0.30 | 1.83481 | 42.7 |
| 9 | 16.326 | 0.17 | | |
| 10 | 11.471 | 1.40 | 1.95906 | 17.5 |
| 11 | 126.251 | (variable) | | |
| 12 (stop) | ∞ | −0.20 | | |
| 13* | 7.247 | 1.60 | 1.80610 | 40.7 |
| 14* | −18.505 | 0.05 | | |
| 15 | 5.027 | 1.40 | 1.59282 | 68.6 |
| 16 | 32.322 | 0.30 | 2.00069 | 25.5 |
| 17 | 3.749 | (variable) | | |
| 18 | 11.933 | 2.35 | 1.63854 | 55.4 |
| 19 | −46.451 | 0.40 | 1.92286 | 18.9 |
| 20 | −125.623 | (variable) | | |
| 21 | ∞ | 0.80 | 1.51633 | 64.1 |
| 22 | ∞ | 0.94 | | |
| Image Plane | ∞ | | | |

Aspheric Surface Data 6-th surface

K = −4.98796e+003  A4 = −3.44592e−005  A6 = 8.97220e−006
A8 = −1.74458e−007  A10 = 8.04728e−010

7-th surface

K = 3.33333e−001  A4 = −2.50036e−004  A6 = 3.67516e−005
A8 = −1.84990e−006  A10 = 8.76148e−008

13-th surface

K = 1.20904e+000  A4 = −1.42435e−003  A6 = −2.45519e−005
A8 = −6.59501e−006  A10 = −9.74137e−007

14-th surface

K = 2.48242e+001  A4 = −2.09231e−004  A6 = 3.82963e−005
A8 = −1.48471e−005

Various Data
Zoom Ratio 17.04

| | Wide Angle | Intermediate | Telephoto |
|---|---|---|---|
| Focal Length | 4.63 | 20.58 | 78.97 |
| F number | 3.92 | 5.39 | 7.10 |
| Half Field Angle (degree) | 35.40 | 10.66 | 2.75 |
| BF | 3.48 | 11.36 | 4.04 |
| Image Height | 3.29 | 3.88 | 3.80 |
| OLL | 46.14 | 54.66 | 65.68 |
| d5 | 0.47 | 13.16 | 22.04 |
| d11 | 16.24 | 4.22 | 0.50 |
| d17 | 7.71 | 7.69 | 20.86 |
| d20 | 2.01 | 9.89 | 2.57 |

Zoom Lens Unit Data

| Unit | Leading Surface | Focal Length |
|---|---|---|
| 1 | 1 | 34.96 |
| 2 | 6 | −5.88 |
| 3 | 12 | 10.38 |
| 4 | 18 | 18.33 |

[Numerical Embodiment 2]
Lengths in the following data are in millimeters.

| Surface data | | | | |
|---|---|---|---|---|
| Surface number | r | d | nd | vd |
| 1 | 40.461 | 0.82 | 1.85478 | 24.8 |
| 2 | 22.944 | 3.60 | 1.49700 | 81.5 |
| 3 | 254.593 | 0.05 | | |
| 4 | 23.445 | 2.90 | 1.77250 | 49.6 |
| 5 | 90.522 | (variable) | | |
| 6* | 419.262 | 0.40 | 1.85135 | 40.1 |
| 7* | 5.820 | 2.90 | | |
| 8 | −17.299 | 0.30 | 1.80400 | 46.6 |
| 9 | 17.299 | 0.17 | | |
| 10 | 11.783 | 1.40 | 1.95906 | 17.5 |
| 11 | 84.857 | (variable) | | |
| 12 (stop) | ∞ | −0.20 | | |
| 13* | 6.536 | 1.60 | 1.76802 | 49.2 |
| 14* | −29.454 | 0.05 | | |
| 15 | 6.013 | 1.40 | 1.71300 | 53.9 |
| 16 | 15.587 | 0.30 | 2.00069 | 25.5 |
| 17 | 4.008 | (variable) | | |
| 18 | 11.730 | 2.35 | 1.63854 | 55.4 |
| 19 | −13.615 | 0.40 | 1.85026 | 32.3 |
| 20 | −76.480 | (variable) | | |
| 21 | ∞ | 0.50 | 1.51633 | 64.1 |
| 22 | ∞ | 0.24 | | |
| Image Plane | ∞ | | | |

Aspheric Surface Data 6-th surface

K = 5.34263e+003  A4 = −2.06480e−005  A6 = 5.25368e−007
A8 = 6.34498e−008  A10 = −2.15677e−009

7-th surface

K = 4.17379e−002  A4 = −2.64028e−005  A6 = 1.12311e−005
A8 = 1.28046e−007  A10 = 6.42672e−009

13-th surface

K = −4.17957e−001  A4 = −2.59838e−004  A6 = 2.92481e−005
A8 = −4.08923e−007  A10 = 1.14646e−008

14-th surface

K = −2.80658e+000  A4 = 1.00177e−004  A6 = 4.37570e−005
A8 = −1.42559e−006

Various Data
Zoom Ratio 21.30

| | Wide Angle | Intermediate | Telephoto |
|---|---|---|---|

-continued

| Focal Length | 4.60 | 18.41 | 98.00 |
|---|---|---|---|
| F number | 3.23 | 4.03 | 7.10 |
| Half Field Angle (degree) | 35.61 | 11.89 | 2.22 |
| BF | 2.62 | 10.36 | 1.07 |
| Image Height | 3.29 | 3.88 | 3.80 |
| OLL | 47.58 | 53.38 | 68.71 |
| d5 | 0.93 | 13.67 | 22.36 |
| d11 | 16.88 | 5.02 | 0.43 |
| d17 | 8.71 | 5.88 | 26.42 |
| d20 | 2.05 | 9.79 | 0.50 |

Zoom Lens Unit Data

| Unit | Leading Surface | Focal Length |
|---|---|---|
| 1 | 1 | 35.56 |
| 2 | 6 | −5.76 |
| 3 | 12 | 10.30 |
| 4 | 18 | 19.90 |

[Numerical Embodiment 3]
Lengths in the following data are in millimeters.

Surface data

| Surface Number | r | d | nd | vd |
|---|---|---|---|---|
| 1 | 55.002 | 0.82 | 1.85478 | 24.8 |
| 2 | 29.876 | 3.60 | 1.49700 | 81.5 |
| 3 | −334.698 | 0.05 | | |
| 4 | 26.982 | 2.90 | 1.71300 | 53.9 |
| 5 | 106.737 | (variable) | | |
| 6* | −1094.207 | 0.40 | 1.85135 | 40.1 |
| 7* | 6.594 | 2.40 | | |
| 8 | −13.000 | 0.30 | 1.77250 | 49.6 |
| 9 | 13.000 | 0.17 | | |
| 10 | 10.759 | 1.40 | 1.95906 | 17.5 |
| 11 | 85.092 | (variable) | | |
| 12 (stop) | ∞ | −0.20 | | |
| 13* | 6.278 | 1.60 | 1.69350 | 53.2 |
| 14* | −44.532 | 0.05 | | |
| 15 | 5.782 | 1.40 | 1.60311 | 60.6 |
| 16 | 30.003 | 0.30 | 2.00100 | 29.1 |
| 17 | 4.300 | 0.50 | | |
| 18 | 24.279 | 1.00 | 1.88300 | 40.8 |
| 19 | −1641.733 | (variable) | | |
| 20 | 14.915 | 2.80 | 1.77250 | 49.6 |
| 21 | −23.489 | 0.40 | 1.92286 | 18.9 |
| 22 | −74.700 | (variable) | | |
| 23 | ∞ | 0.80 | 1.51633 | 64.1 |
| 24 | ∞ | 0.90 | | |
| Image Plane | ∞ | | | |

Aspheric Surface Data 6-th surface

K = −1.39705e+004 A4 = −4.95556e−005 A6 = −2.50476e−006
A8 = 2.02767e−007 A10 = −3.64046e−009

7-th surface

K = 1.26654e−001 A4 = −3.53172e−005 A6 = 1.92356e−005
A8 = −1.37625e−006 A10 = 6.70369e−008

13-th surface

K = −3.51671e−001 A4 = −2.41334e−004 A6 = 5.98944e−006
A8 = −1.19893e−006 A10 = 1.99390e−008

14-th surface

K = 4.98579e+000 A4 = 4.10472e−005 A6 = 1.69715e−006
A8 = −6.96534e−007

Various Data

Zoom Ratio 23.13

| | Wide Angle | Intermediate | Telephoto |
|---|---|---|---|
| Focal Length | 4.63 | 20.90 | 107.00 |
| F number | 3.13 | 4.24 | 7.10 |
| Half Field Angle (degree) | 33.65 | 10.51 | 2.03 |
| BF | 4.30 | 13.12 | 6.26 |
| Image Height | 3.08 | 3.88 | 3.80 |
| OLL | 46.77 | 60.16 | 87.13 |
| d5 | 0.89 | 16.12 | 26.60 |
| d11 | 14.64 | 3.69 | 0.48 |
| d19 | 7.04 | 7.35 | 39.89 |
| d22 | 2.87 | 11.69 | 4.83 |

Zoom Lens Unit Data

| Unit | Leading Surface | Focal Length |
|---|---|---|
| 1 | 1 | 40.17 |
| 2 | 6 | −5.54 |
| 3 | 12 | 10.56 |
| 4 | 20 | 17.50 |

[Numerical Embodiment 4]
Lengths in the following data are in millimeters.

Surface data

| Surface Number | r | d | nd | vd |
|---|---|---|---|---|
| 1 | 54.692 | 0.82 | 1.85478 | 24.8 |
| 2 | 29.862 | 3.60 | 1.49700 | 81.5 |
| 3 | −318.141 | 0.05 | | |
| 4 | 26.991 | 2.90 | 1.71300 | 53.9 |
| 5 | 105.366 | (variable) | | |
| 6* | −590.002 | 0.40 | 1.85135 | 40.1 |
| 7* | 6.604 | 2.40 | | |
| 8 | −13.000 | 0.30 | 1.77250 | 49.6 |
| 9 | 13.000 | 0.17 | | |
| 10 | 10.740 | 1.40 | 1.95906 | 17.5 |
| 11 | 79.954 | (variable) | | |
| 12 (stop) | ∞ | −0.20 | | |
| 13* | 6.255 | 1.60 | 1.69350 | 53.2 |
| 14* | −43.194 | 0.05 | | |
| 15 | 5.805 | 1.40 | 1.60311 | 60.6 |
| 16 | 28.065 | 0.30 | 2.00100 | 29.1 |
| 17 | 4.300 | 0.50 | | |
| 18 | 24.758 | 1.00 | 1.88300 | 40.8 |
| 19 | 1095.879 | (variable) | | |
| 20 | 14.970 | 2.80 | 1.77250 | 49.6 |
| 21 | −23.727 | 0.40 | 1.92286 | 18.9 |
| 22 | −73.845 | (variable) | | |
| 23 | ∞ | 0.80 | 1.51633 | 64.1 |
| 24 | ∞ | 0.91 | | |
| Image Plane | ∞ | | | |

Aspheric Surface Data 6-th surface

K = 5.57886e−003 A4 = −8.88296e−005 A6 = −1.90185e−006
A8 = 2.67477e−007 A10 = −5.05020e−009

7-th surface

K = 8.84203e−002 A4 = −7.78893e−005 A6 = 2.12481e−005
A8 = −1.56802e−006 A10 = 8.39696e−008

13-th surface

K = −3.20690e−001 A4 = −2.28541e−004 A6 = 1.05204e−005
A8 = −6.69298e−007 A10 = 5.79791e−008

14-th surface

K = −1.43667e+001 A4 = 7.08432e−005 A6 = 6.75386e−006

-continued

A8 = 3.44794e−007

Various Data
Zoom Ratio 23.73

|  | Wide Angle | Intermediate | Telephoto |
|---|---|---|---|
| Focal Length | 4.63 | 21.13 | 110.00 |
| F number | 3.11 | 4.21 | 7.10 |
| Half Field Angle (degree) | 33.60 | 10.39 | 1.98 |
| BF | 4.22 | 13.27 | 6.35 |
| Image Height | 3.08 | 3.88 | 3.80 |
| OLL | 47.03 | 60.55 | 87.99 |
| d5 | 0.94 | 16.20 | 26.62 |
| d11 | 14.75 | 3.73 | 0.48 |
| d19 | 7.22 | 7.46 | 34.65 |
| d22 | 2.78 | 11.83 | 4.91 |

Zoom Lens Unit Data

| Unit | Leading Surface | Focal Length |
|---|---|---|
| 1 | 1 | 40.07 |
| 2 | 6 | −5.50 |
| 3 | 12 | 10.56 |
| 4 | 20 | 17.50 |

[Numerical Embodiment 5]
Lengths in the following data are in millimeters.

Surface data

| Surface Number | r | d | nd | vd |
|---|---|---|---|---|
| 1 | 54.206 | 0.82 | 1.85478 | 24.8 |
| 2 | 29.470 | 3.60 | 1.49700 | 81.5 |
| 3 | −645.372 | 0.05 |  |  |
| 4 | 27.731 | 2.90 | 1.71300 | 53.9 |
| 5 | 128.042 | (variable) |  |  |
| 6* | −391.885 | 0.40 | 1.85135 | 40.1 |
| 7* | 6.672 | 2.08 |  |  |
| 8 | −13.000 | 0.30 | 1.77250 | 49.6 |
| 9 | 13.000 | 0.17 |  |  |
| 10 | 10.234 | 1.40 | 1.95906 | 17.5 |
| 11 | 63.213 | (variable) |  |  |
| 12 (stop) | ∞ | −0.20 |  |  |
| 13* | 5.750 | 1.60 | 1.69350 | 53.2 |
| 14* | −44.565 | 0.05 |  |  |
| 15 | 6.656 | 1.40 | 1.60311 | 60.6 |
| 16 | 158.946 | 0.30 | 2.00100 | 29.1 |
| 17 | 4.300 | 0.50 |  |  |
| 18 | 11.565 | 1.00 | 1.91082 | 35.3 |
| 19 | 40.961 | (variable) |  |  |
| 20 | 13.827 | 2.80 | 1.77250 | 49.6 |
| 21 | −32.346 | 0.40 | 1.92286 | 18.9 |
| 22 | −211.750 | (variable) |  |  |
| 23 | ∞ | 0.80 | 1.51633 | 64.1 |
| 24 | ∞ | 0.90 |  |  |
| Image Plane | ∞ |  |  |  |

Aspheric Surface Data 6-th surface

K = 3.14733e+003 A4 = −3.99973e−005 A6 = −1.03888e−007
A8 = 1.75141e−007 A10 = −4.16277e−009

7-th surface

K = 7.21190e−001 A4 = −1.57580e−004 A6 = 6.67071e−006
A8 = −4.34025e−007 A10 = 3.41279e−008

13-th surface

K = −3.56960e−001 A4 = −2.76368e−004 A6 = 5.94185e−006
A8 = −5.23976e−007 A10 = −3.97152e−008

-continued 14-th surface

K = 4.38280e+001 A4 = 4.41443e−005 A6 = 1.38683e−005
A8 = −1.28696e−006

Various Data
Zoom Ratio 22.20

|  | Wide Angle | Intermediate | Telephoto |
|---|---|---|---|
| Focal Length | 4.50 | 19.70 | 100.00 |
| F number | 3.40 | 4.62 | 7.10 |
| Half Field Angle (degree) | 34.36 | 11.13 | 2.18 |
| BF | 3.56 | 12.03 | 4.28 |
| Image Height | 3.08 | 3.88 | 3.80 |
| OLL | 45.54 | 57.28 | 77.76 |
| d5 | 0.73 | 15.85 | 27.33 |
| d11 | 14.72 | 3.86 | 0.47 |
| d19 | 6.95 | 5.96 | 26.10 |
| d22 | 2.13 | 10.60 | 2.85 |

Zoom Lens Unit Data

| Unit | Leading Surface | Focal Length |
|---|---|---|
| 1 | 1 | 40.70 |
| 2 | 6 | −5.61 |
| 3 | 12 | 10.10 |
| 4 | 20 | 18.00 |

[Numerical Embodiment 6]
Lengths in the following data are in millimeters.

Surface data

| Surface Number | r | d | nd | vd |
|---|---|---|---|---|
| 1 | 47.703 | 0.82 | 1.85478 | 24.8 |
| 2 | 24.829 | 3.60 | 1.49700 | 81.5 |
| 3 | 3256.582 | 0.05 |  |  |
| 4 | 24.063 | 2.90 | 1.77250 | 49.6 |
| 5 | 100.673 | (variable) |  |  |
| 6* | 399.368 | 0.40 | 1.85135 | 40.1 |
| 7* | 6.096 | 2.90 |  |  |
| 8 | −16.292 | 0.30 | 1.80400 | 46.6 |
| 9 | ∞ | 0.20 |  |  |
| 10 | 17.024 | 0.30 | 1.80400 | 46.6 |
| 11 | 8.821 | 0.17 |  |  |
| 12 | 8.485 | 1.40 | 1.95906 | 17.5 |
| 13 | 21.596 | (variable) |  |  |
| 14 (stop) | ∞ | −0.20 |  |  |
| 15* | 6.582 | 1.60 | 1.76802 | 49.2 |
| 16* | −28.693 | 0.05 |  |  |
| 17 | 6.200 | 1.40 | 1.71300 | 53.9 |
| 18 | 18.070 | 0.30 | 2.00069 | 25.5 |
| 19 | 4.133 | (variable) |  |  |
| 20 | 12.479 | 2.60 | 1.63854 | 55.4 |
| 21 | −11.039 | 0.40 | 1.85026 | 32.3 |
| 22 | −55.083 | (variable) |  |  |
| 23 | ∞ | 0.80 | 1.51633 | 64.1 |
| 24 | ∞ | 0.78 |  |  |
| Image Plane | ∞ |  |  |  |

Aspheric Surface Data 6-th surface

K = 4.74145e+003 A4 = −4.72041e−005 A6 = 5.42535e−006
A8 = −6.94159e−008 A10 = −9.97289e−010

7-th surface

K = 2.29998e−001 A4 = −1.12692e−004 A6 = −4.94748e−007
A8 = 1.37221e−006 A10 = −2.97801e−008

15-th surface

-continued

K = −3.45090e−001 A4 = −2.01393e−004 A6 = 1.58506e−005
A8 = −1.92140e−007 A10 = 8.47030e−008
16-th surface K = −1.51399e+001 A4 = 1.44040e−004 A6 = 3.12039e−005
A8 = −2.25001e−006 A10 = 2.17456e−007

Various Data
Zoom Ratio 18.68

|  | Wide Angle | Intermediate | Telephoto |
|---|---|---|---|
| Focal Length | 4.70 | 51.01 | 87.77 |
| F number | 3.53 | 4.73 | 7.10 |
| Half Field Angle (degree) | 35.03 | 4.34 | 2.48 |
| Image Height | 3.29 | 3.88 | 3.80 |
| OLL | 48.64 | 61.91 | 69.77 |
| BF | 2.65 | 8.40 | 2.91 |
| d5 | 0.93 | 21.74 | 22.36 |
| d13 | 16.88 | 1.43 | 0.43 |
| d19 | 8.71 | 10.88 | 24.61 |
| d22 | 1.35 | 7.10 | 1.61 |

Zoom Lens Unit Data

| Unit | Leading Surface | Focal Length |
|---|---|---|
| 1 | 1 | 35.80 |
| 2 | 6 | −5.86 |
| 3 | 14 | 10.42 |
| 4 | 20 | 21.00 |

TABLE 1

|  | Con. 1 $\beta 3t/\beta 3w$ | Con. 2 f3/ft | Con. 3 |f3n/f3| | Con. 4 N3n | Con. 5 f3pave/f3 | Con. 6 N3pave | Con. 7 f1/ft | Con. 8 |f2|/fw | Con. 9 f4/fw |
|---|---|---|---|---|---|---|---|---|---|
| Embod. 1 | 2.80 | 0.131 | 0.41 | 2.001 | 0.795 | 1.699 | 0.44 | 1.27 | 3.95 |
| Embod. 2 | 3.12 | 0.105 | 0.53 | 2.001 | 0.973 | 1.741 | 0.36 | 1.25 | 4.33 |
| Embod. 3 | 4.38 | 0.099 | 0.46 | 2.001 | 1.476 | 1.727 | 0.38 | 1.20 | 3.78 |
| Embod. 4 | 4.50 | 0.096 | 0.48 | 2.001 | 1.531 | 1.727 | 0.36 | 1.19 | 3.78 |
| Embod. 5 | 3.47 | 0.101 | 0.44 | 2.001 | 1.199 | 1.736 | 0.41 | 1.25 | 4.00 |
| Embod. 6 | 3.21 | 0.120 | 0.52 | 2.001 | 0.630 | 1.770 | 0.41 | 1.25 | 4.47 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-266577, filed Dec. 25, 2013, which is hereby incorporated by reference herein in its entirety.

What is claimed is:

1. A zoom lens comprising, in order from an object side to an image side:

a first lens unit having a positive refractive power;
a second lens unit having a negative refractive power;
a third lens unit having a positive refractive power; and
a fourth lens unit having a positive refractive power,
wherein:
the first, second, third and fourth lens units move during zooming from the wide angle end to the telephoto end,
the first lens unit comprises three or less lenses,
the second lens unit comprises four or less lenses,
the third lens unit comprises four or less lenses,
the fourth lens unit comprises two or less lenses, the third lens unit includes a negative lens, and
the zoom lens satisfies the following conditional expressions:

$2.65 < \beta 3t/\beta 3w < 10.00$, $0.05 < f3/ft < 0.14$, and $0.35 < |f3n|/f3 < 0.55$, where $\beta 3w$ is the lateral magnification of the third lens unit at the wide angle end, $\beta 3t$ is the lateral magnification of the third lens unit at the telephoto end, f3 is the focal length of the third lens unit, ft is the focal length of the entire system at the telephoto end, and f3n is the focal length of the negative lens in the third lens unit.

2. A zoom lens according to claim 1, wherein the zoom lens satisfies the following conditional expression:

$1.850 < N3n < 2.500$, where N3n is the refractive index of the material of the negative lens in the third lens unit.

3. A zoom lens according to claim 1, wherein the third lens unit includes two or more positive lenses, and the zoom lens satisfies the following conditional expression:

$0.50 < f3pave/f3 < 1.55$, where f3pave is the average of the focal lengths of the positive lenses included in the third lens unit.

4. A zoom lens according to claim 1, wherein the third lens unit includes two or more positive lenses, and the zoom lens satisfies the following conditional expression:

$1.690 < N3pave < 2.500$, where N3pave is the average of the refractive indices of the materials of the positive lenses included in the third lens unit.

5. A zoom lens according to claim 1, wherein the zoom lens satisfies the following conditional expression:

$0.30 < f1/ft < 0.50$, where f1 is the focal length of the first lens unit.

6. A zoom lens according to claim 1, wherein the zoom lens satisfies the following conditional expression:

$0.50 < |f2|/fw < 1.35$, where f2 is the focal length of the second lens unit, and fw is the focal length of the entire system at the wide angle end.

7. A zoom lens according to claim 1, wherein the zoom lens satisfies the following conditional expression:

$3.0 < f4/fw < 5.0$, where f4 is the focal length of the fourth lens unit, and fw is the focal length of the entire system at the wide angle end.

8. A zoom lens according to claim 1, wherein during zooming from the wide angle end to the telephoto end, the first lens unit moves along a locus convex to the image side, the second lens unit moves toward the image side, the third lens unit moves toward the object side, and the fourth lens unit moves along a locus convex to the object side.

9. A zoom lens according to claim 1, wherein during zooming from the wide angle end to the telephoto end, the first lens unit moves along a locus convex to the image side, the second lens unit moves toward the object side, the third lens unit moves toward the object side, and the fourth lens unit moves along a locus convex to the object side.

10. A zoom lens according to claim 1, wherein the third lens unit consists of, in order from the object side to the image side, a positive lens and a cemented lens made up of a positive lens and a negative lens that are cemented together.

11. A zoom lens according to claim 1, wherein the third lens unit consists of, in order from the object side to the image side, a positive lens, a cemented lens made up of a positive lens and a negative lens that are cemented together, and a positive lens.

12. A zoom lens according to claim 1, wherein the second lens unit consists of, in order from the object side to the image side, a negative lens, a negative lens, and a positive lens.

13. A zoom lens according to claim 1, wherein the second lens unit consists of, in order from the object side to the image side, a negative lens, a negative lens, a negative lens, and a positive lens.

14. A zoom lens according to claim 1, wherein the fourth lens unit consists of a cemented lens made up of a negative lens and a positive lens that are cemented together.

15. A zoom lens according to claim 1, wherein the first lens unit consists of, in order from the object side to the image side, a cemented lens made up of a negative lens and a positive lens that are cemented together, and a positive lens.

16. A zoom lens according to claim 1, which forms an image onto an image pickup element.

17. An image pickup apparatus comprising:
a zoom lens; and
an image pickup element configured to receive an image formed by the zoom lens, wherein the zoom lens comprises, in order from an object side to an image side:
a first lens unit having a positive refractive power;
a second lens unit having a negative refractive power;
a third lens unit having a positive refractive power; and
a fourth lens unit having a positive refractive power, wherein
the first, second, third and fourth lens units move during zooming from the wide angle end to the telephoto end,
the first lens unit comprises three or less lenses,
the second lens unit comprises four or less lenses,
the third lens unit comprises four or less lenses,
the fourth lens unit comprises two or less lenses,
the third lens unit includes a negative lens, and
the zoom lens satisfies the following conditional expressions:

$2.65 < \beta 3t/\beta 3w < 10.00$, $0.05 < f3/ft < 0.14$, and $0.35 < |\beta 3n|/\beta 3 < 0.55$, where $\beta 3w$ is the lateral magnification of the third lens unit at the wide angle end, $\beta 3t$ is the lateral magnification of the third lens unit at the telephoto end, f3 is the focal length of the third lens unit, ft is the focal length of the entire system at the telephoto end, and f3n is the focal length of the negative lens in the third lens unit.

18. A zoom lens comprising, in order from an object side to an image side:
a first lens unit having a positive refractive power;
a second lens unit having a negative refractive power;
a third lens unit having a positive refractive power; and
a fourth lens unit having a positive refractive power, wherein:
the first, second, third and fourth lens units move during zooming from the wide angle end to the telephoto end,
the first lens unit comprises three or less lenses,
the second lens unit comprises four or less lenses,
the third lens unit comprises four or less lenses,
the fourth lens unit comprises two or less lenses,
the third lens unit includes two or more positive lenses, and
the zoom lens satisfies the following conditional expressions:

$2.65 < \beta 3t/\beta 3w < 10.00$, $0.05 < f3/ft < 0.14$, and $1.690 < N3\text{pave} < 2.500$, where $\beta 3w$ is the lateral magnification of the third lens unit at the wide angle end, $\beta 3t$ is the lateral magnification of the third lens unit at the telephoto end, f3 is the focal length of the third lens unit, ft is the focal length of the entire system at the telephoto end, and N3pave is the average of the refractive indices of the materials of the positive lenses included in the third lens unit.

19. A zoom lens comprising, in order from an object side to an image side:
a first lens unit having a positive refractive power;
a second lens unit having a negative refractive power;
a third lens unit having a positive refractive power; and
a fourth lens unit having a positive refractive power, wherein:
the first, second, third and fourth lens units move during zooming from the wide angle end to the telephoto end,
the first lens unit comprises three or less lenses,
the second lens unit comprises four or less lenses,
the third lens unit comprises four or less lenses,
the fourth lens unit comprises two or less lenses, and
the zoom lens satisfies the following conditional expressions:

$2.65 < \beta 3t/\beta 3w < 10.00$, $0.05 < f3/ft < 0.14$, and $3.0 < f4/fw < 5.0$, where $\beta 3w$ is the lateral magnification of the third lens unit at the wide angle end, $\beta 3t$ is the lateral magnification of the third lens unit at the telephoto end, f3 is the focal length of the third lens unit, ft is the focal length of the entire system at the telephoto end, f4 is the focal length of the fourth lens unit, and fw is the focal length of the entire system at the wide angle end.

20. A zoom lens comprising, in order from an object side to an image side:
   a first lens unit having a positive refractive power;
   a second lens unit having a negative refractive power;
   a third lens unit having a positive refractive power; and
   a fourth lens unit having a positive refractive power,
      wherein:
      during zooming from the wide angle end to the telephoto end, the first lens unit moves along a locus convex to the image side, the second lens unit moves toward the image side, the third lens unit moves toward the object side, and the fourth lens unit moves along a locus convex to the object side,
      the first lens unit comprises three or less lenses,
      the second lens unit comprises four or less lenses,
      the third lens unit comprises four or less lenses,
      the fourth lens unit comprises two or less lenses, and
      the zoom lens satisfies the following conditional expressions:

$2.65 < \beta 3t/\beta 3w < 10.00$, and $0.05 < f3/ft < 0.14$, where $\beta 3w$ is the lateral magnification of the third lens unit at the wide angle end, $\beta 3t$ is the lateral magnification of the third lens unit at the telephoto end, f3 is the focal length of the third lens unit, and ft is the focal length of the entire system at the telephoto end.

21. A zoom lens comprising, in order from an object side to an image side:
   a first lens unit having a positive refractive power;
   a second lens unit having a negative refractive power;
   a third lens unit having a positive refractive power; and
   a fourth lens unit having a positive refractive power,
      wherein:
      the first, second, third and fourth lens units move during zooming from the wide angle end to the telephoto end,
      the first lens unit comprises three or less lenses,
      the second lens unit comprises four or less lenses,
      the third lens unit comprises four or less lenses,
      the fourth lens unit comprises two or less lenses,
      the third lens unit consists of, in order from the object side to the image side, a positive lens and a cemented lens made up of a positive lens and a negative lens that are cemented together, and
      the zoom lens satisfies the following conditional expressions:

$2.65 < \beta 3t/\beta 3w < 10.00$, and $0.05 < f3/ft < 0.14$, where $\beta 3w$ is the lateral magnification of the third lens unit at the wide angle end, $\beta 3t$ is the lateral magnification of the third lens unit at the telephoto end, f3 is the focal length of the third lens unit, and ft is the focal length of the entire system at the telephoto end.

* * * * *